(12) United States Patent
Sekiya et al.

(10) Patent No.: US 10,833,837 B2
(45) Date of Patent: Nov. 10, 2020

(54) ELECTRONIC APPARATUS AND WIRELESS COMMUNICATION METHOD

(71) Applicant: KABUSHIKI KAISHA TOSHIBA, Minato-ku, Tokyo (JP)

(72) Inventors: Masahiro Sekiya, Tokyo (JP); Toshihisa Nabetani, Kanagawa (JP); Narendar Madhavan, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/054,950

(22) Filed: Aug. 3, 2018

(65) Prior Publication Data

US 2019/0296886 A1    Sep. 26, 2019

(30) Foreign Application Priority Data

Mar. 20, 2018   (JP) ................................. 2018-052827

(51) Int. Cl.
| | |
|---|---|
| *H04L 5/16* | (2006.01) |
| *H04L 5/00* | (2006.01) |
| *H04W 80/02* | (2009.01) |
| *H04W 74/08* | (2009.01) |
| *H04W 72/04* | (2009.01) |

(52) U.S. Cl.
CPC .............. *H04L 5/16* (2013.01); *H04L 5/0055* (2013.01); *H04W 72/0446* (2013.01); *H04W 74/0808* (2013.01); *H04W 80/02* (2013.01)

(58) Field of Classification Search
CPC ........ H04L 5/16; H04L 5/0055; H04W 72/02; H04W 72/04; H04W 72/0446; H04W 74/0808; H04W 80/02
See application file for complete search history.

(56) References Cited

U.S. PATENT DOCUMENTS

| | | | |
|---|---|---|---|
| 9,467,275 | B2 | 10/2016 | Tetzlaff et al. |
| 9,929,851 | B2 | 3/2018 | Zhou et al. |
| 10,439,788 | B2 | 10/2019 | Nabetani et al. |

(Continued)

FOREIGN PATENT DOCUMENTS

| | | |
|---|---|---|
| JP | 2016-539593 A | 12/2016 |
| JP | 2017-028552 A | 2/2017 |

(Continued)

OTHER PUBLICATIONS

U.S. Appl. No. 15/909,532, filed Mar. 1, 2018, Nabetani et al.

(Continued)

*Primary Examiner* — Candal Elpenord
(74) *Attorney, Agent, or Firm* — Foley & Lardner LLP

(57) ABSTRACT

According to one embodiment, an electronic apparatus includes a transmitter circuitry and a receiver circuitry. The transmitter circuitry is configured to; transmit a first frame to a first terminal, and transmit a second frame to a second terminal when a first period elapsed after transmission of the first frame. The receiver circuitry is configured to receive a third frame including acknowledgement information of the first frame from the first terminal when the first period elapsed after transmission of the first frame. A duration of the second frame is set as equal to or greater than a difference between a duration of the third frame and a duration of the first frame.

18 Claims, 15 Drawing Sheets

(56) References Cited

U.S. PATENT DOCUMENTS

| | | | |
|---|---|---|---|
| 2014/0078940 A1* | 3/2014 | Aggarwal | H04L 1/1854 370/278 |
| 2014/0169233 A1* | 6/2014 | Aggarwal | H04W 74/08 370/277 |
| 2015/0172025 A1* | 6/2015 | Kwon | H04W 52/0216 370/329 |
| 2015/0271850 A1* | 9/2015 | Kim | H04W 74/08 370/329 |
| 2016/0345295 A1* | 11/2016 | Yang | H04W 8/005 |
| 2017/0078076 A1 | 3/2017 | Fang et al. | |
| 2017/0150492 A1 | 5/2017 | Ozaki | |
| 2017/0150493 A1* | 5/2017 | Seok | H04B 7/0452 |
| 2019/0089519 A1 | 3/2019 | Nabetani et al. | |

FOREIGN PATENT DOCUMENTS

| | | |
|---|---|---|
| JP | 2019-054458 A | 4/2019 |
| WO | WO-2016-024356 | 2/2016 |

OTHER PUBLICATIONS

Taori et al., "Considerations for In-Band Simultaneous Transmit and Receive (STR) feature in HEW," IEEE 11-13/1122-01-0hew (Sep. 2013) Samsung.

Kraemer et al., "Part 11: Wireless LAN Medium Access Control (MAC) and Physical Layer (PHY) Specifications," IEEE Std 802.11™-2012 (Mar. 2012) IEEE Computer Society.

Kulick et al., "Part 11: Wireless LAN Medium Access Control (MAC) and Physical Layer (PHY) Specifications; Amendment 4: Enhancements for Very High Throughput for Operation in Bands below 6 GHz," IEEE Std 802.11ac™-2013 (Dec. 2013) IEEE Computer Society.

Banerjea et al., "A Simplified Simultaneous Transmit and Receive MAC Proposal," IEEE 802.11-14/0340-00-0hew (Mar. 2014).

* cited by examiner

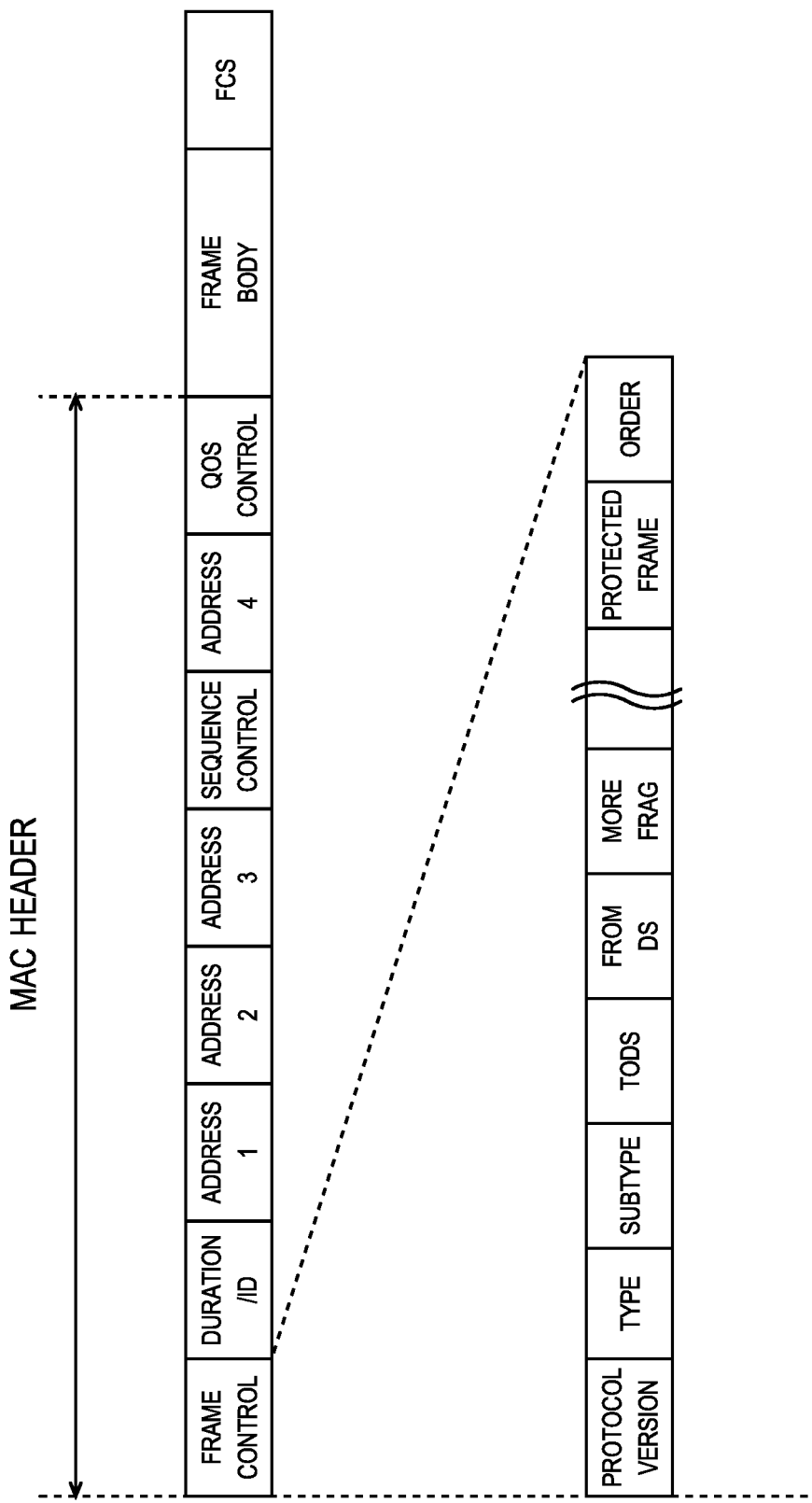

ELECTRONIC APPARATUS AND WIRELESS COMMUNICATION METHOD

CROSS-REFERENCE TO RELATED APPLICATIONS

This application is based upon and claims the benefit of priority from Japanese Patent Application No. 2018-052827, filed on Mar. 20, 2018; the entire contents of which are hereby incorporated by reference.

FIELD

Embodiments described herein relate generally to an electronic apparatus and a wireless communication method.

BACKGROUND

One of the solutions for improving performance of data communication in wireless communication systems such as wireless LAN is application of full duplex communication. Wireless communication devices capable of full duplex communication execute data transmission and data reception concurrently using a specific frequency band. By using full duplex communication, it is possible to transmit and receive frames between the wireless communication devices efficiently, improving the effective communication speed.

However, if a wireless communication device capable of full duplex communication and a wireless communication device only capable of half duplex communication are both included in the wireless communication system, some problems occur. For example, depending on the transmission and reception timings of the frames, a plurality of response frames may arrive simultaneously. Also, the wireless communication devices may fail to transmit the response frames within the regulated deadlines. Longer periods may be required to complete the data communication process. Thus, it is desired to improve effective communication speed of the wireless communication system while maintaining the consistency of the frame transmission and reception sequence.

BRIEF DESCRIPTION OF THE DRAWINGS

FIG. 15 is a MAC frame format defined in IEEE 802.11.

DETAILED DESCRIPTION

According to one embodiment, an electronic apparatus includes a transmitter circuitry and a receiver circuitry. The transmitter circuitry is configured to; transmit a first frame to a first terminal, and transmit a second frame to a second terminal when a first period elapsed after transmission of the first frame. The receiver circuitry is configured to receive a third frame including acknowledgement information of the first frame from the first terminal when the first period elapsed after transmission of the first frame. Duration of the second frame is set as equal to or greater than a difference between a duration of the third frame and a duration of the first frame.

Hereinafter, embodiments of the present invention will be described with reference to the drawings.

The entire contents of IEEE Std 802.11™-2012 and IEEE Std 802.11ac™-2013, known as the wireless LAN specification are herein incorporated by reference in the present specification.

Hereinafter, a description is given of embodiments of the present invention with reference to the drawings.

First Embodiment

Figure 1:
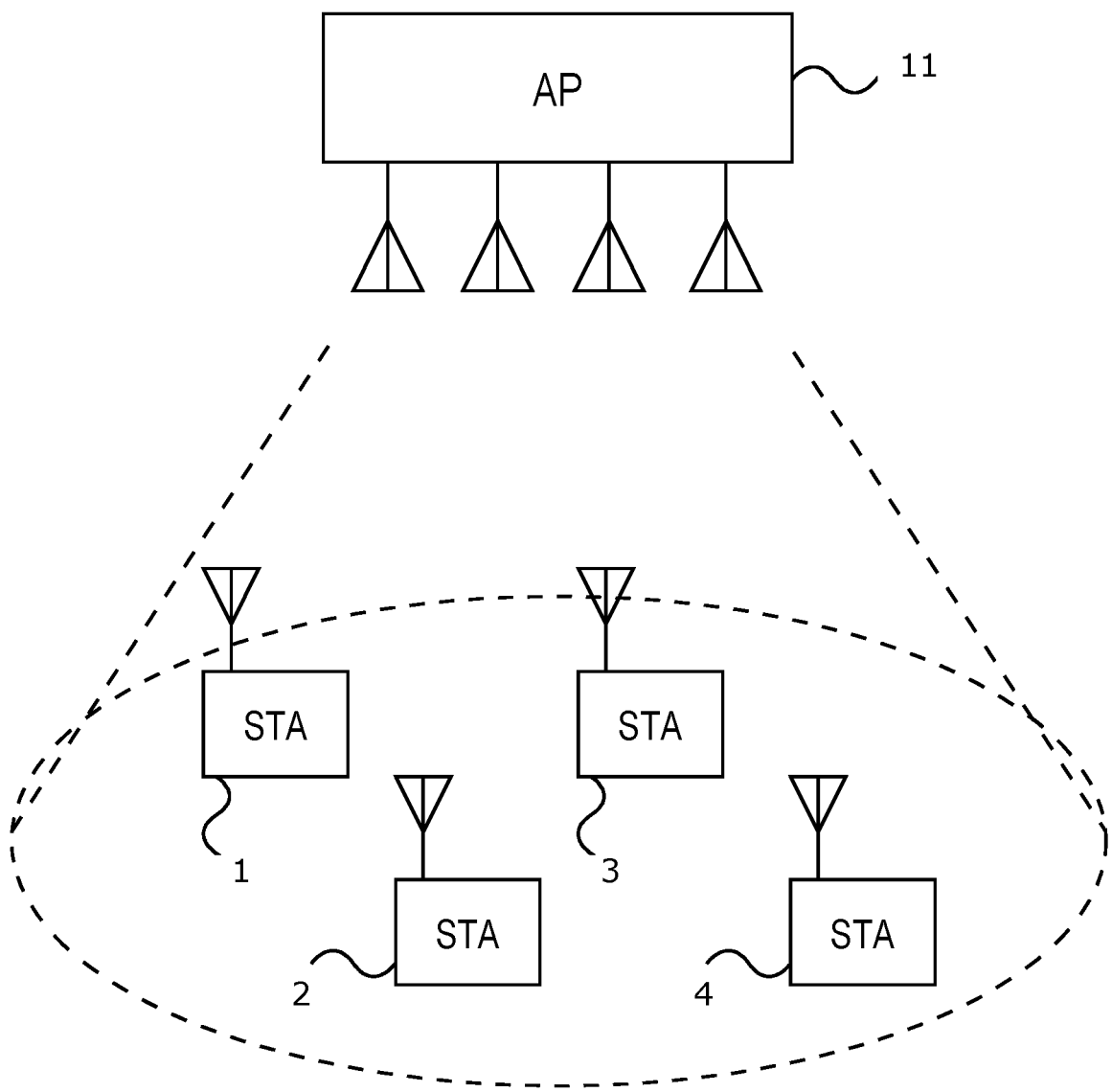
FIG. 1 is a diagram of a wireless communication system according to a first embodiment.

FIG. 1 is a diagram of a wireless communication system according to a first embodiment. The wireless communication system according to the first embodiment will be described in reference to FIG. 1.

The wireless communication system of FIG. 1 is a wireless LAN (Local Area Network) including an access point (AP) 11 which is a base station and a plurality of wireless terminals (STA) 1-4. The access point 11 according to one embodiment is a wireless communication device installed in a specific location. In another embodiment, the access point 11 is a wireless communication device capable of operating as an access point by transitions of modes.

In the following, a case when the wireless LAN is operating in infrastructure mode is explained as an example. However, this does not exclude applications to ad hoc mode networks where a plurality of wireless communication device communicates with each other directly without having the base station in the middle. In one embodiment, either of the wireless communication device operates as the owner of the ad hoc mode network.

The access point 11 is a wireless communication device with full duplex communication capability. The wireless terminals 1 and 2 are wireless communication devices only capable of half duplex communication. The wireless terminals 3 and 4 are wireless communication devices with full duplex communication capability. Wireless communication devices with full duplex communication capability are also capable of half duplex communication. However, wireless communication devices only capable of half duplex communication are not capable of full duplex communication.

Figure 2:
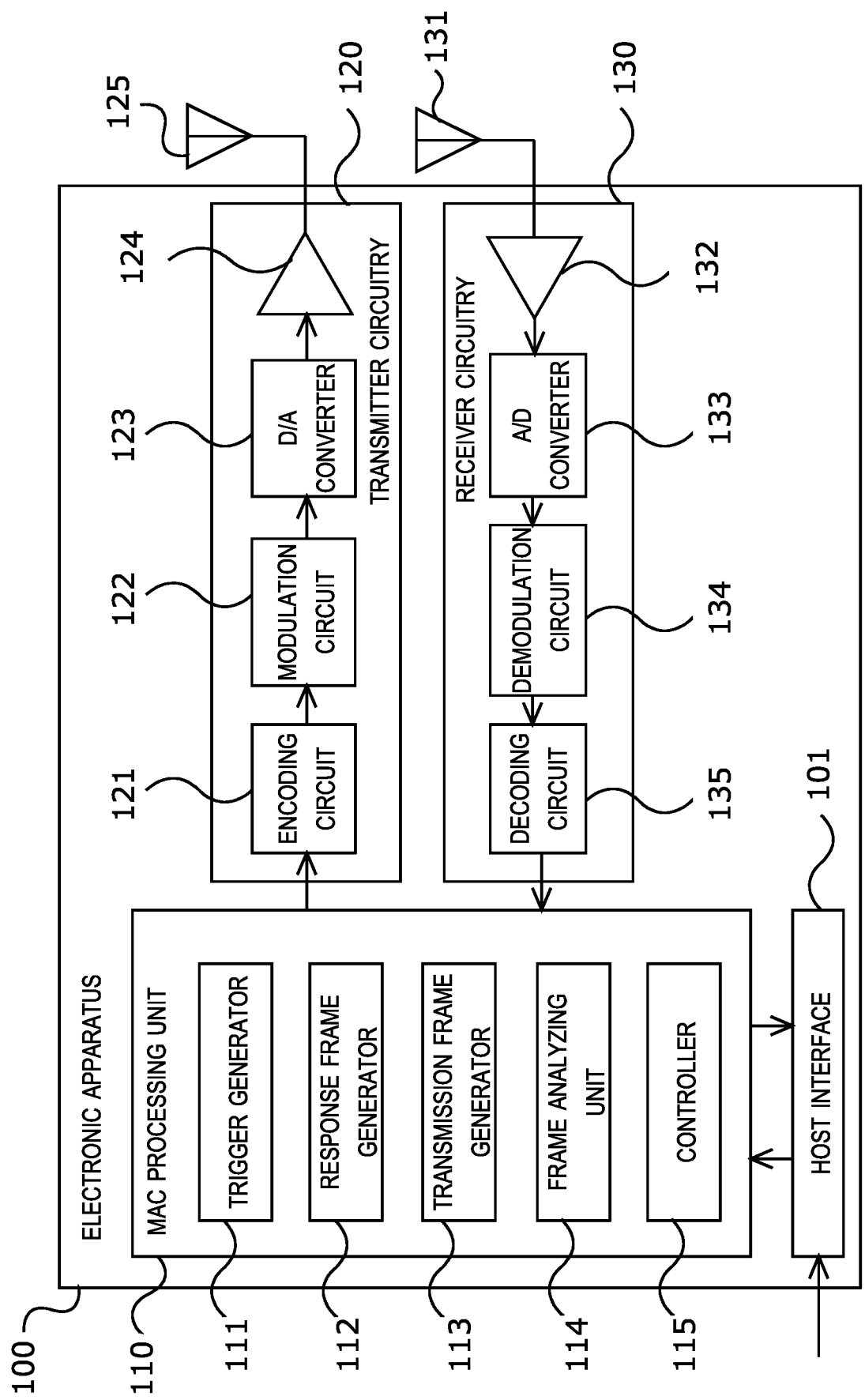
FIG. 2 is a block diagram of an electronic apparatus according to the first embodiment.

FIG. 2 is a block diagram of an electronic apparatus according to the first embodiment. The electronic apparatus according to the first embodiment will be described in reference to FIG. 2.

An electronic apparatus 100 in FIG. 2 includes a wireless communication device which executes data communication compliant to wireless LAN standards such as IEEE802.11 series or their successor standards. Examples of IEEE802.11 series standards include, IEEE802.11a, IEEE802.11b, IEEE802.11g, IEEE802.11n, IEEE802.11ac, IEEE802.11ax or the like. Wireless LAN is only one of the examples of communication standards the electronic apparatus 100 uses. Therefore, in another embodiment, the electronic apparatus 100 uses a different communication standard.

The electronic apparatus 100 includes a host interface 101, a MAC processing unit 110, a transmitter circuitry 120, and a receiver circuitry 130. The MAC processing unit 110 includes a trigger generator 111, a response frame generator 112, a transmission frame generator 113, a frame analysis unit 114 and a controller 115 as internal components. The transmitter circuitry 120 includes an encoding circuit 121, a modulation circuit 122, a D/A converter 123, a transmission amplifier 124 and an antenna 125. The receiver circuitry 130 includes an antenna 131, a low-noise amplifier 132, an A/D converter 133, demodulation circuit 134 and a decoding circuit 135.

A host interface 101 enables communication of data between the electronic apparatus 100 and a computer in a host side. Examples of the host interface 101 include, PCI Express, USB, UART, SPI, SDIO and Ethernet. However, in other embodiments, different interfaces are used. Examples of the computer in the host side include smartphones, tablets, PCs, servers, control oriented microcomputers, printers, digital cameras, video cameras, robots or in-vehicle information systems. However, different devices are usable as long as they include a processor (a CPU).

The host interface 101 transfers data received from the computer to the MAC processing unit 110. Also, the host interface 101 transfers data received from the MAC processing unit 110 to the computer.

The MAC processing unit 110 executes processes which correspond to the MAC layer (Media Access Control Layer). These processes include conversion of transmitted data to MAC frames, configuration of received data from the received MAC frames, controlling the duration of MAC frames, generation of control frames and configuration of control information in MAC frames. The transmitter circuitry 120 transmits data by using an antenna 125. The receiver circuitry 130 receives data by using an antenna 131.

Next, the internal components of the transmitter circuitry 120 are explained.

The encoding circuit 121 encodes the transmitted signal provided from the MAC processing unit 110, which is in MAC frame format. Examples of the MAC frames includes, a data frame and control frames. BA (Block ACK), ACK and CTS (Clear to Send) are examples of the control frames. Various block codes and convolutional codes are selectable for the encoding scheme. However, the encoding scheme (method) which is used is not limited.

The modulation circuit 122 modulates digital signals provided from the encoding circuit 121. Examples of modulation schemes include FSK (Frequency Shift Keying), BPSK and QAM. However, the modulation scheme used is not limited. The D/A converter 123 convert digital signals to analog signals. The transmission amplifier 124 amplifies the analog signal converted by the D/A converter 123. Then, the amplified signal is transmitted from the antenna 125.

In one embodiment, the transmitter circuitry 120 includes components which execute frequency conversion. Such components include mixers, local oscillators or the like. In one embodiment, the transmitter circuitry 120 up-converts analog signals which are in baseband frequency to radio frequency. Also, in another embodiment, the transmitter circuitry 120 includes filters such as a low-pass filter, a band-pass filter, a notch filter or the like.

The antenna 125 transmits radio signals to other wireless communication devices. Here, frequencies of signals transmitted by the antenna and frequencies of signals received by the antenna are called the radio frequency. 2.4 GHz bands or 5 GHz bands are selected as the radio frequency in some embodiments. However, the selectable range of frequency is not limited. Also, the configuration and shape of the antenna 125 is not limited.

Next, internal components of the receiver circuitry 130 are explained.

The antenna 131 receives radio signals transmitted from other wireless communication devices. The configuration and the form of the antenna 131 are not limited. The low-noise amplifier 132 amplifies the received signals which are analog signals. The A/D converter 133 converts received signals from analog signals to digital signals. The demodulation circuit 134 demodulates the received signals which are converted to digital signals. In the demodulation process, synchronization of OFDM symbol timings, Fourier transformations such as the FFT (Fast Fourier Transform) are executed. The decoding circuit 135 decodes the received signals which are digital signals and converts the signals to MAC frame format. Examples of decoding process include de-interleaving and the decoding of error correction codes. Finally, the received signals converted to MAC frame format is transferred to the MAC processing unit 110.

In one embodiment, the receiver circuitry includes components which execute frequency conversion. Examples of components which execute frequency conversion include mixers, local oscillators or the like. For example, in one embodiment, the radio frequency signal is down-converted to analog signals in baseband frequency. In another embodiment, the receiver circuitry 130 includes filters such as a low-pass filter, a band-pass, a notch filter or the like.

In one embodiment, the modulation circuit 122 and the demodulation circuit 134 executes modulation processes and demodulation processes by referring to information indicating the frame length, information indicating the transmission rate or information indicating the frequency band stored in a PHY (Physical) header. The demodulation circuit 134 notifies information including the conditions of modulation and demodulation to the MAC processing unit 110. Similarly, in another embodiment, the encoding circuit 121 and the decoding circuit 135 executes encoding processes and decoding processes by referring to information stored in the PHY (Physical) header. In one embodiment, decoding circuit 135 notifies the decoding condition to the MAC processing unit 110.

In one embodiment, the wireless communication unit 100 executes modulation processes, demodulation processes or encoding processes based on IEEE802.11 (wireless LAN) standards.

Next, components included in the MAC processing unit 110 are explained.

The trigger generator 111 generates Trigger frames. Trigger frames are used in Uplink Multi-User communication to specify a wireless terminal or a plurality of wireless terminals from the access point as the destination of data. Examples of Uplink Multi-User communication include Uplink Orthogonal Frequency Division Multiple Access (UL-OFDMA).

The response frame generator 112 generates frames (response frames) including acknowledgement information (confirmation of acceptance). Examples of response frames including acknowledgement information are ACK frames or BA (Block ACK) frames. For example, if the CRC (Cyclic Redundancy Code) calculated from the received MAC frame match with the original CRC, it is determined that the reception of data is successful. Then, a response frame including acknowledgement information could be transmitted.

The transmission frame generator 113 generates frames with specified durations. The generated frames are either frames with the default durations or frames with durations which are different from the default values. By setting transmission rate to values different from default values, changing transmitted data size to values different from default values or generating frames including dummy data, it is possible to generate frames with durations which are different from the default values.

The frame analyzing unit 114 refers to the data stored in the frames and obtains necessary information. The frame analyzing unit 114 refers to fields in the header or the body of the frames, obtaining information such as the destination of the frame and the type of the frame. Also, the frame analyzing unit 114 refers to the data stored in the received frames and calculates the CRC.

The controller 115 controls various components of the electronic apparatus 100. The controller 115 executes processes necessary for transmission of data and reception of data. For example, if a received frame is transferred from the decoding circuit 135 to the MAC processing unit, the controller 115 orders the frame analyzing unit 114 to calculate the CRC of the corresponding frame. If the calculated CRC matches the CRC calculated in the source device, the controller 115 orders the response frame generator 112 to generate frames including acknowledgement information (for example, ACK frames). Then, the controller 115 passes the ACK frame to the encoding circuit 121 and initiates the data transmission process, when it is the timing when the ACK frame should be transmitted.

Each component of the electronic apparatus 100 is implemented by hardware circuitry including semiconductor circuits, FPGAs, PLDs, ASICs or the like in one embodiment. In another embodiment, each component of the electronic apparatus 100 is implemented by programs operating on processors. In a different embodiment, each component of the electronic apparatus 100 is implemented by combinations of the above.

The configuration of the electronic apparatus 100 in FIG. 1 is only an example. Thus, in one embodiment, an electronic apparatus with a different configuration is used. In one embodiment, the electronic apparatus 100 includes a superheterodyne receiver. In other embodiments, the electronic apparatus is a Low-IF (Low-Intermediate Frequency) type device, a sliding IF type device or a digital PLL type device. The type of wireless communication device is not limited to the types mentioned above.

Next, an example of access control in a wireless communication system is explained. Here, a case when the wireless communication system is a wireless LAN is explained. Electronic apparatuses belonging to the same wireless LAN share a same frequency channel for communication of data. A plurality of electronic apparatuses which share the same frequency channel communicate by using a specific access control method. Examples of access control methods include CSMA/CA (Carrier Sense Multiple Access with Collision Avoidance).

Using the wireless LAN of FIG. 1, access control by CSMA/CA is described below.

In the following, the process executed by the access point 11 before transmitting data to the wireless terminal is explained. If CSMA/CA is used for access control, the access point 11 confirms the usage of the frequency channel before transmitting radio signals. If the frequency channel is not used for a certain period and none of the wireless terminals are transmitting radio signals, the access point 11 starts to transmit radio signals. If it is determined that the frequency channel is being used, the access point 11 postpones the data transmission process until the frequency channel becomes vacant.

By comparing the power level of the received signals with a threshold value, it is possible to confirm the usage of the frequency channel. For example, if the power level of received signals is higher than the threshold value, it is determined that the corresponding frequency channel is being used. If the power level of the received signals is lower than the threshold value, it is determined that the corresponding frequency channel is not used. Then, the access point 11 is allowed to transmit frames.

The processes executed by the wireless terminals 1-4 before transmission of data are similar to above. Thus, each wireless terminal confirms the usage of the frequency channel before transmission of data. It is only when it is determined that the corresponding frequency channel is not used that the frames are transmitted by the wireless terminals.

Figure 3:
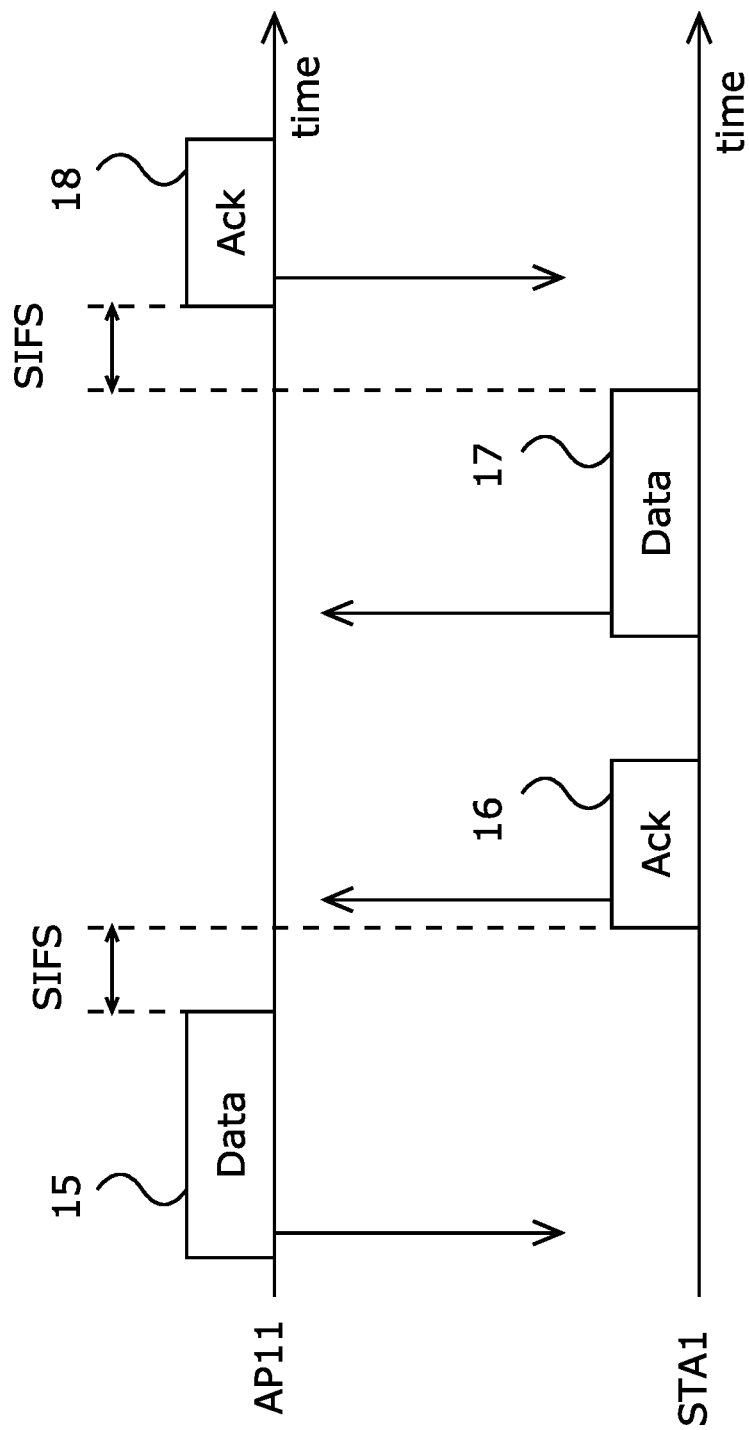
FIG. 3 is a diagram of a frame transmission and reception sequence in half duplex communication.

FIG. 3 is a diagram of a frame transmission and reception sequence in half duplex communication. In FIG. 3, frames transmitted by the access point 11 and frames transmitted by the wireless terminal 1 are illustrated from the top to the bottom. The horizontal direction of FIG. 3 represents the time. Thus, the length of the frames in FIG. 3 illustrate the length of transmission time (duration) of frames. Below, the frame sequence is explained in reference to FIG. 3.

In the following, a plurality of frame sequences shall be presented. In each sequence, the electronic apparatus starts the transmission of frame after obtaining authority to transmit by using CSMA/CA.

First, the access point 11 sets the wireless terminal 1 as the destination device and transmits a data frame 15. If the wireless terminal 1 receives the data frame 15, successfully a response frame 16 with access point 11 assigned as the destination device is transmitted. In the example of FIG. 3, an ACK frame is used as the response frame 16.

Next, the wireless terminal 1 tries to transmit a data frame 17 with access point 11 configured as the destination device. If the access point 11 is still transmitting the data frame 15, the wireless terminal 1 determines that the frequency channel is used by CSMA/CA. In this case, the wireless terminal 1 postpones transmission of data frame 17 until the corresponding frequency channel becomes vacant.

In the example shown in FIG. 3, the wireless terminal 1 transmits the response frame 16 and the data frame 17. In wireless LAN, if there is a plurality of frames to be transmitted, response frames such as ACK frames and Block ACK frames are given the highest priorities for transmission. Therefore, the wireless terminal 1 transmits the frames in the order of; the response frame 16 and the data frame 17.

The wireless terminal 1 starts to transmit the response frame 16 after the duration specified in SIFS (Short Inter Frame Space) has elapsed since the reception of data frame 15 is completed. SIFS is the minimum interval between frames specified in the wireless LAN standard. Here, the duration between the terminal of the data frame and the starting point of the response frame is defined as the SIFS. Examples of the SIFS include 16 microseconds defined in IEEE802.11a. However, different durations are selectable as the SIFS. SIFS is an example of a first period.

The wireless terminal 1 confirms the usage of the frequency channel when transmission of the response frame 16 is completed. If the frequency channel is not used for a certain period, the wireless terminal 1 starts the transmission process of data frame 17.

In the example of FIG. 3, the wireless communication devices execute half duplex communication. Therefore, when the access point 11 is transmitting the data frame 15, the wireless terminal 1 cannot transmit the data frame 17. Also, the access point 11 cannot transmit frames when the wireless terminal is transmitting the data frame 17. If all the wireless communication devices in the wireless communication system uses half duplex communication, it is difficult to shorten the time required to complete the whole frame transmission and reception sequence.

Figure 4:
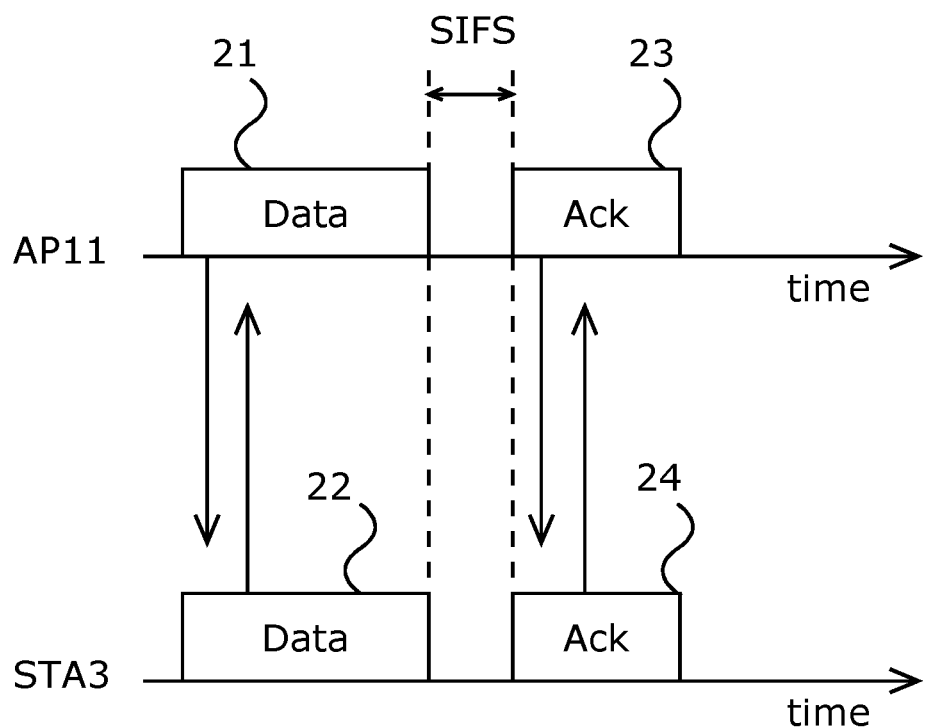
FIG. 4 is a diagram of a frame transmission and reception sequence in full duplex communication.

FIG. 4 is a diagram of a frame transmission and reception sequence in full duplex communication. In FIG. 4, frames transmitted by the access point 11 and frames transmitted by the wireless terminal 3 are illustrated from the top to the bottom. The horizontal direction of FIG. 4 represents the time. Thus, the length of the frames in FIG. 4 illustrate the length of transmission time (duration) of frames. Below, the frame sequence is explained in reference to FIG. 4.

Both the access point 11 and the wireless terminal 3 are wireless communication devices with full duplex communication capabilities. Thus, the access point 11 can execute a process to transmit a data frame 21 with the wireless terminal 3 configured as the destination device and a process to receive a data frame 22 transmitted from the wireless terminal 3, concurrently. Similarly, the wireless terminal 3 can execute a process to transmit the data frame 22 with the access point 11 configured as the destination device and a process to receive a data frame 21 transmitted from the access point 11, concurrently.

In the example of FIG. 4, the duration of data frame 21 and 22 are equal. However, in one embodiment, the duration of data frame 21 and 22 are different.

The access point 11 receives a response frame 23 after the period defined in SIFS has elapsed since the reception of the data frame 22 is completed. Similarly, the wireless terminal 3 receives a response frame 24 after the period defined in SIFS has elapsed since the reception of the data frame 21 is completed. In the example of FIG. 4, both response frames 23 and 24 are ACK frames. However, the type of response frame is not limited.

The access point 11 executes a process to transmit the response frame 23 with the wireless terminal 3 configured as the destination device and a process to receive the response frame 24 transmitted from the wireless terminal 3, concurrently. Similarly, the wireless terminal 3 executes a process to transmit the response frame 24 with the access point 11 configured as the destination device and a process to receive the response frame 23 transmitted from the access point 11.

Thus, if all the wireless communication devices included in the wireless communication system use full duplex communication, it is possible to shorten the time required to complete the frame transmission and reception sequence compared to cases when all the wireless communication devices use half duplex communication. By using full duplex communication, the effective communication speed is improved.

Next, a frame transmission and reception sequence for a wireless communication system including wireless communication devices capable of full duplex communication and wireless communication devices capable of only half duplex communication are explained.

Figure 5:
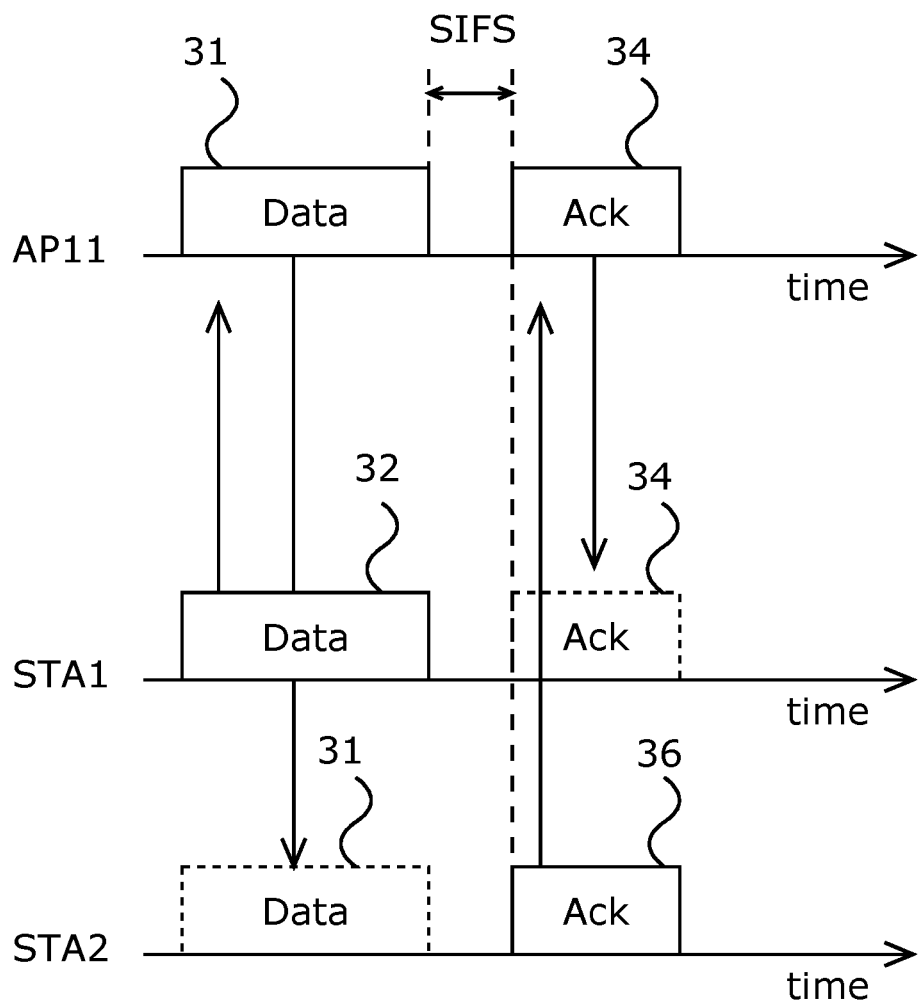
FIG. 5 is a diagram of a first frame transmission and reception sequence when full duplex communication and half duplex communication are combined.

FIG. 5 is a diagram of a first frame transmission and reception sequence when full duplex communication and half duplex communication are combined. In FIG. 5, frames transmitted by the access point 11 and frames transmitted by the wireless terminal 1 are illustrated from the top to the bottom. The horizontal direction of FIG. 5 represents the time. Thus, the length of the frames in FIG. 5 illustrate the length of transmission time (duration) of frames. Below, the frame sequence is explained in reference to FIG. 5.

The access point 11 is a wireless communication device with full duplex communication capability. However, the wireless terminals 1 and 2 are wireless communication devices only capable of half duplex communication. Thus, in the example of FIG. 5, a frame transmission and reception sequence of a wireless communication system with a wireless communication device capable of full duplex communication and wireless communication devices only capable of half duplex communication is shown.

In FIG. 5, the access point 11 is executing a process to receive a data frame 32 transmitted from the wireless terminal 1 and a process to transmit a data frame 31 with the wireless terminal 2 configured as the destination device, concurrently. The wireless terminal 2 transmits a response frame 36 with the access point 11 configured as the destination device after period defined in SIFS has elapsed since the reception of data frame 31 is completed. Also, the access point 11 transmits a response frame 34 after the period defined in SIFS has elapsed since the reception of data frame 32 is completed.

In the example of FIG. 5, both response frames 34 and 36 are in ACK frame format. However, the type of response frame is not limited.

In the example of FIG. 4, the wireless terminal which is the destination device of the frame transmitted by the access point 11 and the source device of frames received by the access point 11 were the same wireless communication devices. However, in the example of FIG. 5, the wireless terminal which is the destination device of the frame transmitted by the access point 11 and the source device of frames received by the access point 11 are different devices. Thus, if the access point selects different wireless terminals for the destination device of frames and source device of received frames, it is possible to utilize time efficiently, improving the effective communication speed.

In the following, the wireless communication device with full duplex communication capability is called the first wireless communication device. The first wireless communication device is an electronic apparatus. The first terminal and the second terminal are wireless communication devices only capable of half duplex communication. The access point 11 in FIG. 1 is an example of the first wireless communication device. The wireless terminal 1 in FIG. 1 is an example of the first terminal. The wireless terminal 2 in FIG. 1 is an example of the second terminal.

The frames transmitted from the first wireless communication device to the first terminal are called first frames. The frames transmitted by the first wireless communication device after the first frame are called second frames. Frames including acknowledgement information of the first frame and are transmitted from the first terminal to the first wireless communication device are called third frames. The type of frames for the first frame, the second frame and the third frame are not limited.

Figure 6:
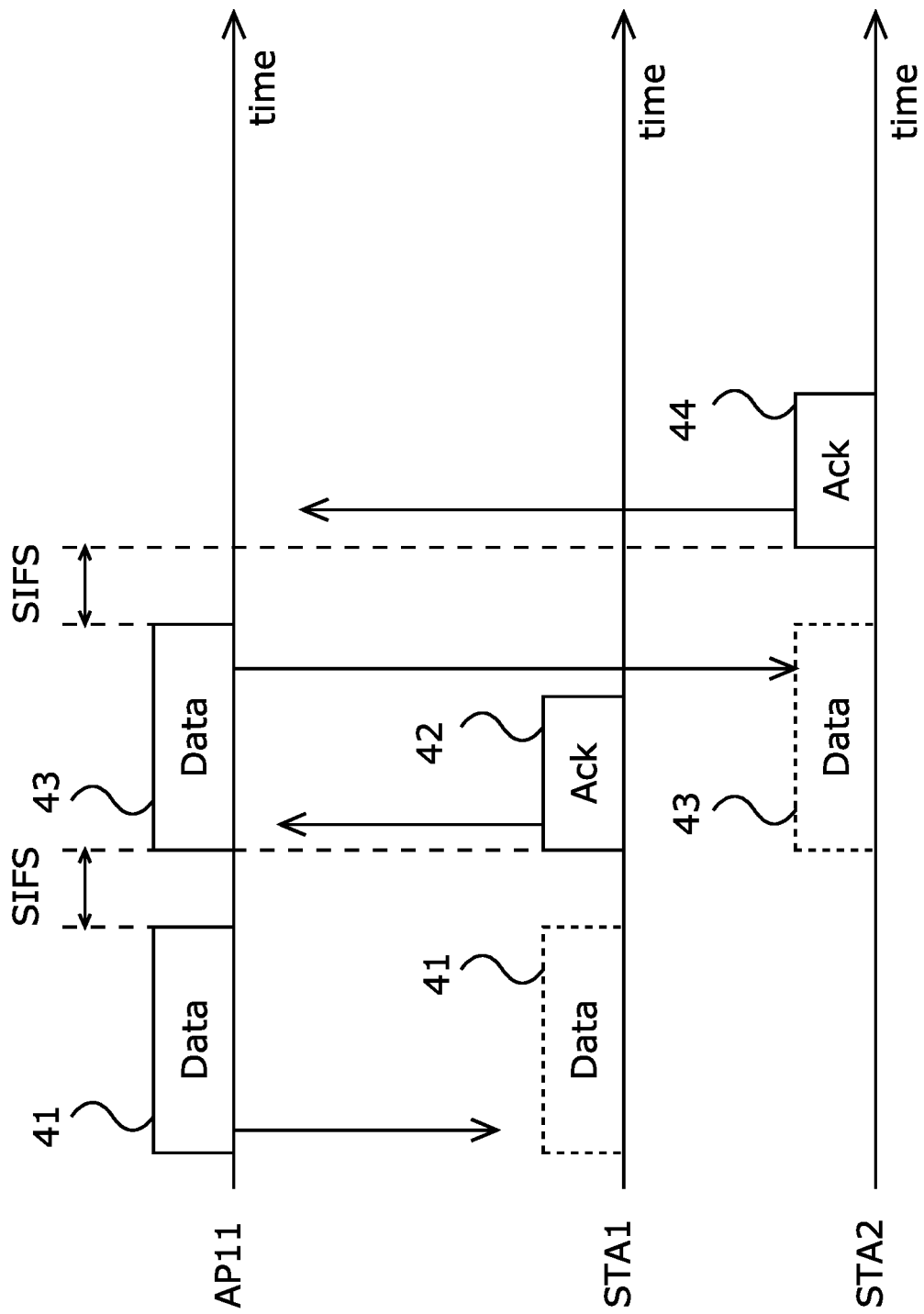
FIG. 6 is a diagram of a second frame transmission and reception sequence when full duplex communication and half duplex communication are combined.

FIG. 6 is a diagram of a second frame transmission and reception sequence when full duplex communication and half duplex communication are combined. In FIG. 6, frames transmitted by the access point 11, frames transmitted by the wireless terminal 1 and frames transmitted by the wireless terminal 2 are illustrated from the top to the bottom. The horizontal direction of FIG. 6 represents the time. Thus, the length of the frames in FIG. 6 illustrate the length of transmission time (duration) of frames. Below, the frame sequence is explained in reference to FIG. 6.

FIG. 6 is a frame transmission and reception sequence of a wireless communication system including the first wireless communication device capable of full duplex communication and the second and second terminals only capable of half duplex communication. In the example of FIG. 6, the access point is sequentially transmitting data frames to different wireless terminals. However, none of the wireless terminals are transmitting data frames.

In FIG. 6, the access point 11 is transmitting a data frame 41 (first frame) to the wireless terminal 1. The wireless terminal 1 transmits a response frame 42 (third frame) after the period defined in SIFS elapsed since the reception of the data frame 41 (first frame) is completed. The response frame 42 (third frame) includes acknowledgement information of the data frame 41 (first frame). Also, the access point 11 starts to transmit a data frame 43 (third frame) to the wireless terminal 2, when the period defined in SIFS elapsed after the reception of data frame 41 is completed. There is an overlap in the duration of the response frame 42 (third frame) transmitted by the wireless terminal 1 and the duration of the data frame 43 (second frame) transmitted by the access point 11.

If the wireless terminal 2 transmits a response frame 44 with the access point 11 configured as the destination device, after the period defined in SIFS elapsed since the reception of the data frame 43 (second frame) is completed. Even in cases when there are no transmissions of data frames from the wireless terminals such as the example in FIG. 6, it is possible to shorten the time required to complete the frame transmission and reception sequence by configuring the access point to execute full duplex communication.

Next, a case when an issue occurs in the consistency of the frame transmission and reception sequence is explained, for the wireless communication system including the first wireless communication device capable of full duplex communication and the second and second terminals only capable of half duplex communication.

In the example of FIG. 6, the duration of the data frame 43 (second frame) transmitted by the access point 11 was longer than the duration of the response 42 (third frame) transmitted by the wireless terminal 1. However, the duration of the second frame (for example, a data frame) transmitted by the first wireless communication device is not necessarily longer than the duration of the third frame (for example, a response frame) transmitted by the first terminal.

The wireless terminal 1 starts to transmit a response frame 53 (third frame) with the access point 11 configured as the destination device, after the period defined in SIFS has elapsed since the reception of data frame 51 (first frame) is completed. Also, the access point 11 starts to transmit a data frame 52 (second frame) with the wireless terminal 2 configured as the destination device, after the period defined in SIFS has elapsed since the transmission of data frame 51 (first frame) is completed.

There is an overlap in the duration of the response frame 53 which is transmitted by the wireless terminal 1 and the duration of data frame 52 (second frame) transmitted by the access point 11. However, the duration of the response frame 53 (third frame) is longer than the duration of the data frame 52 (second frame). Therefore, the wireless terminal 1 still continues the transmission of the response frame 53 (third frame) even after the access point 11 completes the transmission of the data frame 52 (second frame).

The duration of the data frame 52 (second frame) and the response frame (third frame) depends on the data size included in each frame, the transmission rate and the encoding schemes. If the transmission rate is the same, the duration of the frames becomes proportional to the data size. If the data size included in the frames are the same, the higher the transmission rate is, the shorter the duration of frames become. Also, some encoding schemes place higher priority in the transmission efficiency (throughput) while others place higher priorities in error correction. Generally, if the transmission rate and the data size are equal, the later schemes generate frames with longer durations. Thus, depending on the amount of data, configuration of transmission rate and the configuration of encoding schemes, the duration of the response frame 53 (third frame) is longer than the duration of the data frame 52 (second frame) in some embodiments.

Figure 7:
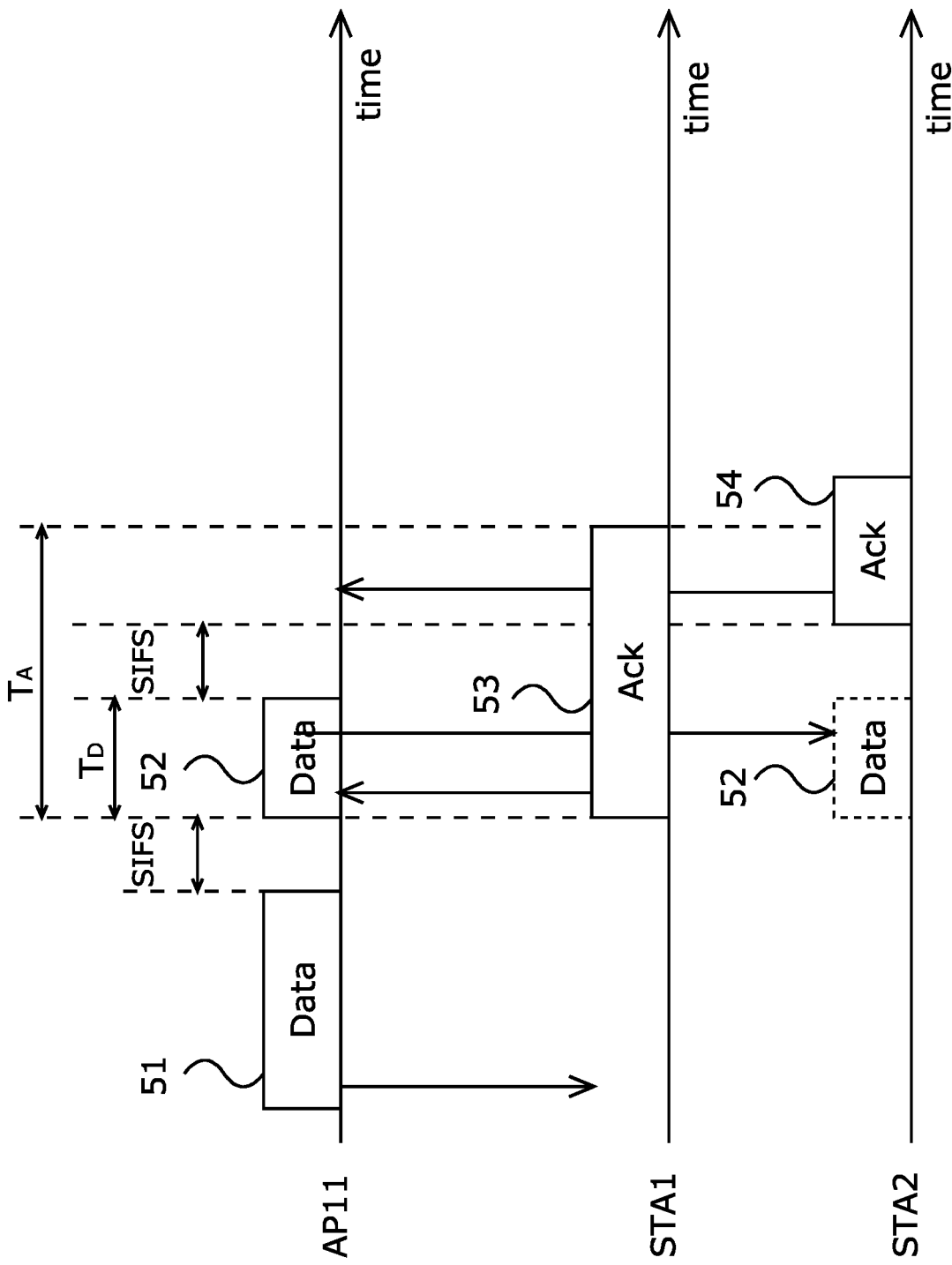
FIG. 7 is a diagram of a case when duration of a data frame is shorter than duration of a response frame.

Referring to FIG. 7, the total duration of the data frame 52 (second frame) $T_D$ and the SIFS $T_{SIFS}$ is smaller than the duration of the response frame 53 (third frame) $T_A$. Thus, the relation $T_D + T_{SIFS} < T_A$ holds. The wireless terminal 2 transmits the response frame 54 to the access point 11, after the period defined in SIFS has elapsed since the reception of the data frame 52 (second frame) is completed. If the relation $T_D + T_{SIFS} < T_A$ holds as illustrated in the example of FIG. 7, there is an overlap between the duration of the response frame 54 transmitted to the access point 11 and the duration of the response frame 53 also transmitted to the access point 11. Since the access point 11 cannot receive a plurality of frames concurrently, it becomes difficult to maintain the consistency of the frame transmission and reception sequence.

To avoid issues in the aforementioned frame transmission and reception sequence, the following condition (1) needs to be fulfilled if the transmission of a data frame (second frame) from the first wireless communication device (for example, access point 11 capable of full duplex communication) to the second terminal (for example, the wireless terminal 2 with only half duplex communication capability) and the transmission of a response frame (third frame) from the first terminal (for, example, the wireless terminal 1 with only half duplex communication capability) to the first wireless communication device are executed concurrently.

$$T_D \geq T_A - T_{SIFS} \tag{1}$$

Here, $T_D$ is the duration of the data frame transmitted by the first wireless communication device (second frame) and $T_A$ is the duration of the response frame transmitted by the first terminal (third frame). $T_{SIFS}$ is the period defined in SIFS.

According the condition of (1), if the duration of the data frame 52 (second frame) is equal to or greater than the total duration of the response frame 53 (third frame) $T_A$ and SIFS, it is possible to keep the frame transmission and reception sequence consistent.

Figure 8:
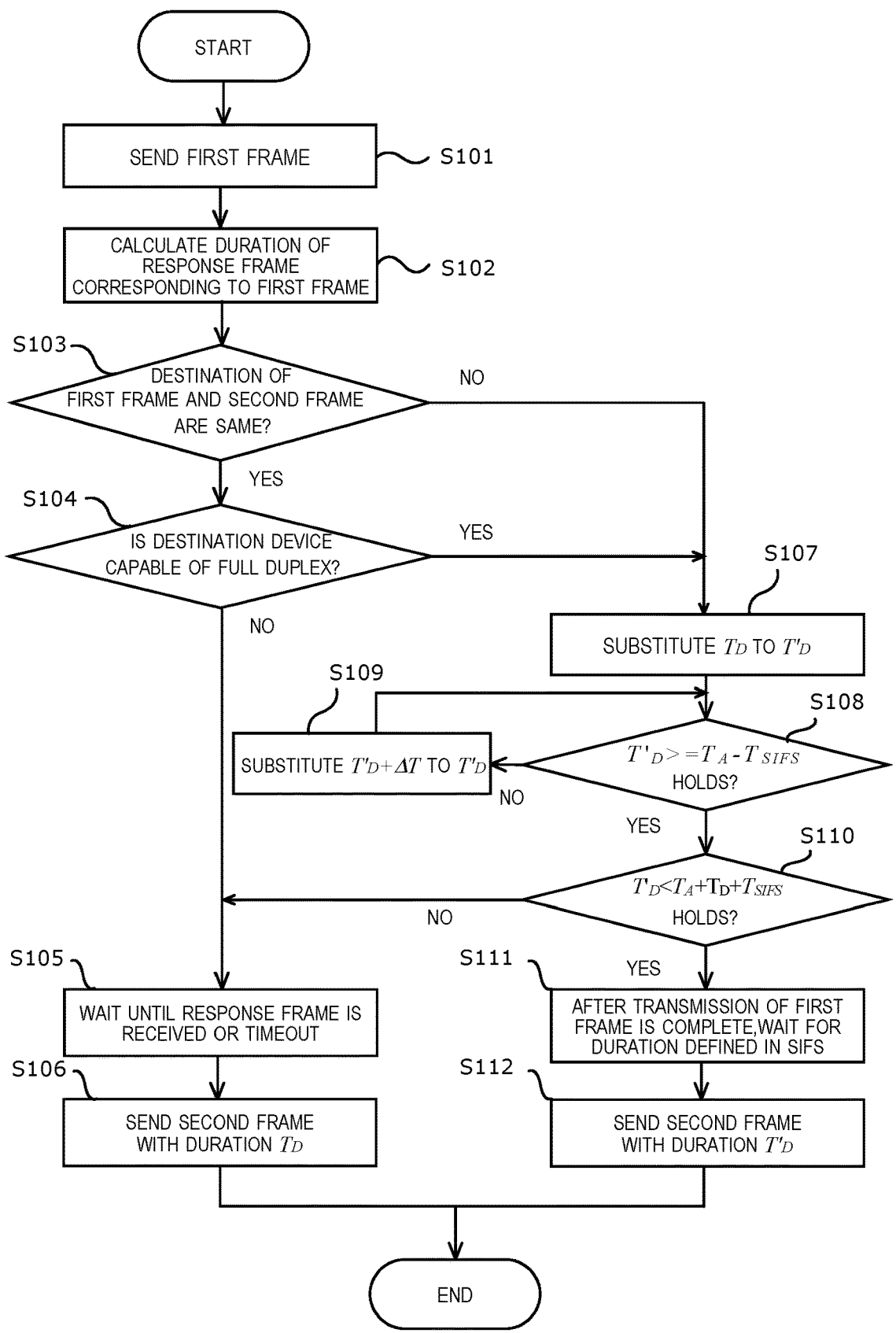
FIG. 8 is a flowchart of a frame transmission and reception sequence executed by the electronic apparatus according to the first embodiment.

Next, the process executed by the wireless communication device to maintain the consistency of the frame transmission and reception sequence is explained. FIG. 8 is a flowchart of a frame transmission and reception sequence executed by the wireless communication device according to the first embodiment. In the following, the process is explained in reference to FIG. 8. The process described in FIG. 8 is executed by the first wireless communication device which is capable of full duplex communication. Examples of the first wireless communication device include the access point 11 in FIG. 1.

First, the first wireless communication device transmits the first frame to another wireless communication device (Step S101). Then, the first wireless communication device calculates the duration of the response frame (third frame) transmitted by another wireless communication device as confirmation of delivery for the first frame (Step S102). It is possible to estimate the duration of the response frame (third frame) corresponding to the first frame by using the configuration of the transmission rate of the first frame, the number of bytes in an ACK frame and the configuration of encoding schemes.

Next, it is determined whether the destination device of the second frame which is the same as the destination device of the first frame (Step S103). If the destination device of the second frame and the first frame are the same, the process proceeds to step S104. If the destination device of the second frame is different from the destination of the first frame, the process proceeds to step S107.

In step S104, it is confirmed whether the wireless communication device which is the destination device of the second frame is capable of full duplex communication. When the wireless communication device establishes connection (associates) with other wireless communication devices, it notifies the capabilities which is supported. Thus, the first wireless communication device can determine whether other wireless communication devices are capable of full duplex communication by saving information of the capabilities supported by other devices.

If the wireless communication device in the destination of the second frame is capable of full duplex communication, the process proceeds to step S107. If the wireless communication device in the destination of the second frame is not capable of full duplex communication, the process proceeds to step S105. In step S105, the wireless communication device waits until the response frame (third frame) is received or until it reaches ACK timeout. Then, the second frame is transmitted to another wireless communication device without changing the duration (step S106). Thus, in step S106, the second frame is transmitted to another wireless communication device with the default (initial) duration $T_D$. The default duration (duration of initial setting) of the second frame $T_D$ is an example of a second duration.

In step S107, the default duration of the second frame $T_D$ is substituted to $T'_D$. $T'_D$ is the duration of the generated second frame. Next, it is determined whether $T'_D$ is equal to or greater than the difference between the duration of the response frame $T_A$ and the period of SIFS $T_{SIFS}$ (Step S108).

If it is determined that the relation $T'_D<T_A-T_{SIFS}$ holds in step S108, $T'_D+\Delta T$ is substituted to $T'_D$, generating a second frame with duration $T'_D$ (Step S109). Here, $\Delta T$ is an example of a third duration. The value of $\Delta T$ (third duration) is not limited. By generating a second frame including dummy data, it is possible to set the duration $T'_D$ a value greater than the default value. Also, it is possible to set the transmission rate of the second frame to a value lower than the default. By changing the encoding scheme of the second frame, it is possible to set the duration $T'_D$ longer than the default value.

Also, in one embodiment, the aforementioned methods are combined to make the duration of the second frame $T'_D$ longer. The methods used for extending the duration of the second frame is not limited. If the duration of the second frame $T'_D$ is extended, step S108 is executed again to confirm whether the relation $T'_D>=T_A-T_{SIFS}$ holds.

If the relation $T'_D>=T_A-T_{SIFS}$ holds in step S108, the process proceeds to step S110. In step S110, it is confirmed whether the relation $T'_D>=T_A-T_D+T_{SIFS}$ is satisfied. Therefore, it is confirmed whether the duration of the second frame $T'_D$ is greater than the sum of the duration of the response frame (third frame) $T_A$, the default duration of the second frame and the period defined in SIFS $T_{SIFS}$.

If the relation $T'_D<T_A-T_D+T_{SIFS}$ holds in step S110, the process proceeds to step S111. In step S111, the wireless communication device waits for the period defined in SIFS, after the transmission of the first frame is completed. Then, a second frame with duration $T'_D$ is transmitted (Step S112). If the process of step S109 is executed, the second frame transmitted in step SS12 is a second frame with duration longer than the default value.

If the relation $T'_D>=T_A-T_D+T_{SIFS}$ holds in step S110, the process proceeds to step S105 and step S106. When the first wireless communication device receives the response frame (third frame) or when the reception of the (third frame) is timed-out, the second frame with default value of duration is transmitted. As described later, if the relation $T'_D<T_A+T_D+T_{SIFS}$ is not satisfied, transmitting a second frame with duration longer than the default value (initial setting) does not shorten the time required to complete the frame transmission and reception sequence. Instead, it makes the time required to complete the frame transmission and reception sequence longer, in some cases.

In above, a case when the duration of the second is shorter than the minimum value ($T'_D<T_A-T_{SIFS}$) was explained. In such cases, the duration $T_D$ is extended. Next, the maximum configurable duration of the second frame $T'_D$ which enables the shortening of the frame transmission and reception sequence is described.

Figure 9:
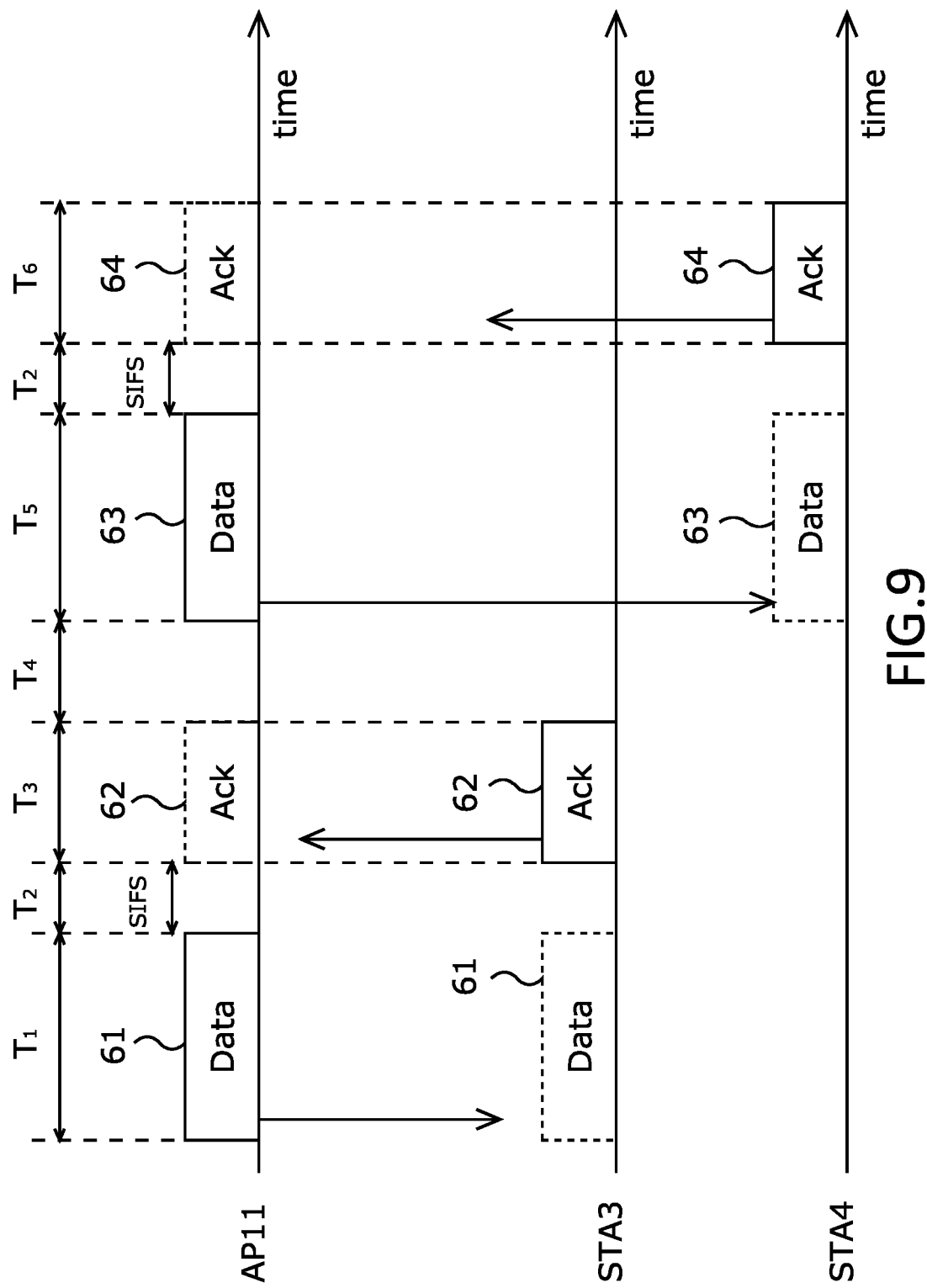
FIG. 9 is a diagram of a frame transmission and reception sequence when the electronic apparatus executes half duplex communication.

FIG. 9 is a diagram of a frame transmission and reception sequence when the wireless communication device executes half duplex communication. In FIG. 9, frames transmitted by the access point 11, frames transmitted by the wireless terminal 3 and frames transmitted by the wireless terminal 4 are illustrated from the top to the bottom. The horizontal direction of FIG. 9 represents the time. Thus, the length of the frames in FIG. 9 illustrate the length of transmission time (duration) of frames. Below, the frame sequence is explained in reference to FIG. 9.

In FIG. 9, the duration of a data frame 61 (first frame) transmitted from the access point 11 to the wireless terminal 3 is $T_1$. The period defined in SIFS is $T_2$. The duration of a response frame 62 (third frame) transmitted from the wireless terminal to the access point 11 is $T_3$. The period between the time when the transmission of the response frame 62 (third frame) is completed and the time when the transmission of a data frame 63 started is $T_4$. The duration of the data frame 63 (second frame) transmitted from the access point 11 to the wireless terminal 4 is $T_5$. The duration of the response frame 64 transmitted from the wireless terminal 4 to the access point 11 is $T_6$.

If the access point 11 executes half duplex communication as illustrated in the sequence of FIG. 9, the total time required to execute the frame transmission and reception sequence is (2) described below.

$$T_1+T_3+T_5+T_6+(2\times T_2)+T_4 \qquad (2)$$

Next, a case when the access point 11 executes full duplex communication as illustrated in the example of FIG. 6 is discussed. The transmission of the second frame and the third frame (response frame corresponding to the first frame) are started simultaneously. The duration of the second frame is longer than the duration of the third frame (response frame). In this case, if the duration of the second frame is $T_x$, the total time required to execute the frame transmission and reception sequence is (3) described below.

$$T_1+T_X+T_6+(2\times T_2) \quad (3)$$

If the value of (3) is smaller than the value of (2), it is possible to shorten the total time required to execute the frame transmission and reception sequence by having the access point 11 execute full duplex communication instead of half duplex communication. To shorten the time required to complete the frame transmission and reception sequence by using full duplex communication, the duration of the frame needs to meet the condition (4) described below.

$$T_X<T_3+T_5+T_4 \quad (4)$$

Therefore, if the frame transmission and reception sequence needs to be shortened by using full duplex communication, the maximum configurable duration $T_x$ of the second frame is equal to the sum of the duration of the third frame (response frame) $T_3$, the period $T_4$ and the default duration of the second frame $T_5$.

The duration of the third frame (response frame) and the length of the period $T_4$ depends on the usage of the frequency channel. Thus, these values are not specified until the transmission of the second frame is completed. However, the minimum value of $T_4$ is equal to the period defined in SIFS, $T_2$. Therefore, if the condition (5) described below is satisfied, it is possible to improve the communication speed by using full duplex communication.

$$T_X<T_3+T_5+T_2 \quad (5)$$

The condition (5) above corresponds to the relation $T'_D<T_A+T_D+T_{SIFS}$ used in step S110 of the flowchart in FIG. 8.

Here, the conditions for the duration of frames are summarized. If transmission of the second frame and the third frame (response frame) are started simultaneously or nearly simultaneously, it is desirable to have the duration of the second frame satisfy the condition (6) described below.

$$T_A-T_{SIFS}\leq T'_D\leq T_A+T_D+T_{SIFS} \quad (6)$$

Here, $T_A$ is the duration of the third frame (response frame), $T_{SIFS}$ is the period of SIFS, $T'_D$ is the duration of the regenerated second frame and $T_D$ is the default duration (second duration) of the second frame.

Above, the condition for the duration of frames were explained. Below, a method for calculating the duration of the frames is described.

The length of the transmission period of a frame according to the IEEE802.11a standard can be represented by the equation (7) below.

$$T_f = T_{p\_s} + T_{sym} \times \text{Ceiling}\left(\frac{22+8\times L}{4\times R}\right) \quad (7)$$

Here, $T_{p\_s}$ is the total of the Preamble and the Signal Field attached to the frame before transmission of data. In the IEEE802.11a standard, $T_{p\_s}$ is 20 microseconds. $T_{sym}$ is the symbol length. In the IEEE802.11a standard, the symbol length is 4 microseconds. Ceiling ( . . . ) is a ceiling function. The ceiling function returns the minimum integer which is equal to or greater than the actual number which is the input. L is the length of the MAC frame in units of bytes. In the IEEE802.11a standard, L takes values from 1 byte to 4095 bytes. R is the transmission rate in units of megabit per second (Mbps). In the IEEE802.11a standard, R takes values of either 6, 9, 12, 18, 24, 36, 48 or 54 Mbps.

The value "22" in the numerator of the parameter of the ceiling function in equation (7) is the total length of the Service bits and Tail bits which is attached during the modulation of the frame.

For example, say the length of the data frame L_d is 50 bytes, the transmission rate of the data frame R_d is 54 Mbps, the length of the ACK frame (response frame) L_d is 14 bytes and the transmission rate of the ACK frame R_a is 6 Mbps. If these values are substituted to the equation (7), the duration of the data frame $T_{fd}$ is 28 microseconds and the duration of the ACK frame (response frame) is 44 microseconds. In this case, the condition of relation (1) is satisfied. Thus, the access point 11 (first wireless communication device) can execute the process of receiving the response frame and the process of transmitting the second frame, concurrently.

Second Embodiment

In the first embodiment, a case when the transmission of the second frame is executed concurrently to the reception of the response frame (third frame) corresponding to the first frame was explained. In the second embodiment, a case when the frame transmission and reception sequence by UL (Uplink) OFDMA is described. The frame transmission and reception sequence by UL OFDMA is currently at the process of standardization in the IEEE802.11ax standard.

If OFDM (Orthogonal Frequency Division Multiplexing) is used in wireless communication, the frequency range is divided into a plurality of subcarriers. Each subcarrier is used to transmit data concurrently in the frequency domain. In OFDM, each subcarrier are orthogonal to each other. Therefore, it is possible to allocate subcarriers densely, utilizing the frequency range effectively. For example, it is possible to use a plurality of 20 MHz-width subcarriers to transmit data of a single user.

If OFDMA (Orthogonal Frequency Division Multiple Access) is used in wireless communication, Resource Units (RUs) which are sets including a plurality of subcarriers are defined in the frequency range. In each Resource Unit, one user can be assigned. By defining a plurality of Resource Units in the subcarriers, it is possible to transmit data belonging to different users, concurrently.

Figure 10:
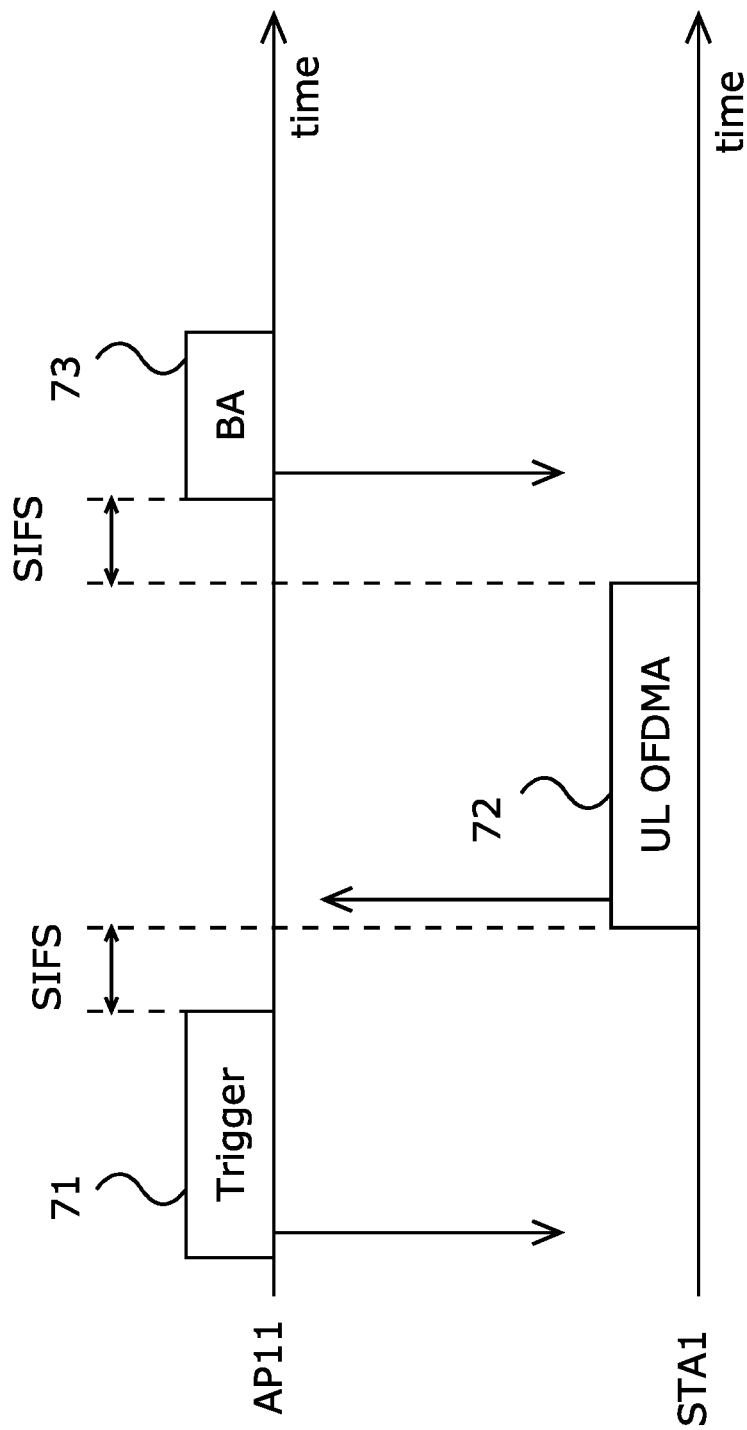
FIG. 10 is a diagram of a frame transmission and reception sequence by UL OFDMA.

FIG. 10 is a diagram of a frame transmission and reception sequence by UL OFDMA. In FIG. 10, frames transmitted by the access point 11 and frames transmitted by the wireless terminal 1 are illustrated from the top to the bottom. The horizontal direction of FIG. 10 represents the time. Thus, the length of the frames in FIG. 10 illustrate the length of transmission time (duration) of frames. Below, the frame sequence is explained in reference to FIG. 10.

First, the access point 11 is transmitting a Trigger Frame 71 (first frame) to the wireless terminal 1. If the wireless terminal 1 receives the Trigger Frame 71 (first frame), the wireless terminal 1 can transmit a frame for UL OFDMA (third frame) after the period defined in SIFS has elapsed. In the example of FIG. 10, UL OFDMA 72 corresponds to the frame for UL OFDMA.

The Trigger frame 71 includes parameters for the physical layer necessary for transmitting the UL OFDMA 72 (control information). Such parameters include the transmission rate and the duration of the frames. The wireless terminal 1 transmits a UL OFDMA 72 which is generated based on the parameters for the physical layer specified in the Trigger frame 71. Thus, the access point 11 controls the duration of the UL OFDMA 72 transmitted by the wireless terminal 1 by using the Trigger frame 71. The Trigger frame is an example of the first frame.

It is possible to include user data besides the acknowledgement information (confirmation of acceptance) in the UL OFDMA 72. The UL OFDMA 72 is an example of the third frame including the acknowledgement information of the first frame. If the UL OFDMA 72 transmitted by the wireless terminal 1 includes user data, the access point 11 transmits a BA frame 73 (a BlockAck frame) to the wireless terminal 1, after the period defined in SIFS has elapsed since the reception of the UL OFDMA 72 is completed, as confirmation of delivery. BA frame 73 is an example of the response frame.

In another embodiment, the access point 11 transmits a M-BA frame (Multi-STA BlockAck frame) instead of a BA frame. The M-BA frame is included in the IEEE802.11ax standard which is currently in the process of standardization.

Figure 11:
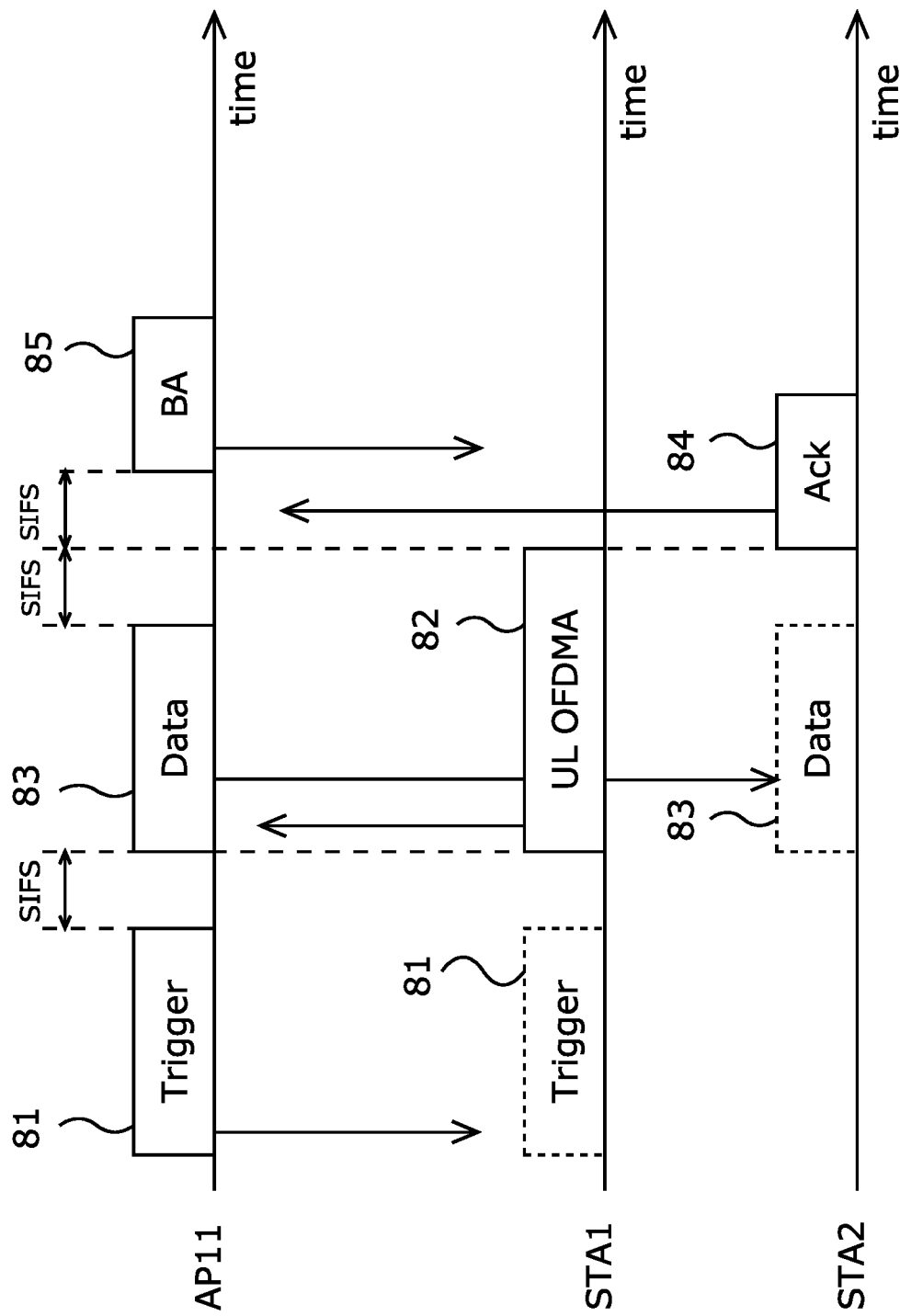
FIG. 11 is a diagram of a frame transmission and reception sequence when duration of data frame is shorter than duration of UL OFDMA.

FIG. 11 is a diagram of a frame transmission and reception sequence when duration of data frame is shorter than duration of UL OFDMA. In FIG. 11, frames transmitted by the access point 11, frames transmitted by the wireless terminal 1 and frames transmitted by the wireless terminal 2 are illustrated from the top to the bottom. The horizontal direction of FIG. 11 represents the time. Thus, the length of the frames in FIG. 11 illustrate the length of transmission time (duration) of frames. Below, the frame sequence is explained in reference to FIG. 11.

In the frame transmission and reception sequence of FIG. 11, the transmission of a UL OFDMA 82 (third frame) by the wireless terminal 1 and the transmission of a data frame 83 (second frame) by the access point 11 is started simultaneously. The destination device of the data frame 83 is the wireless terminal 2. In the frame transmission and reception sequence of FIG. 11, the duration of the frames have to be controlled so that the duration of the ACK frame 84 which is transmitted by the wireless terminal 2 as the confirmation of delivery of the data frame 83 and the duration of the UL OFDMA 82 (third frame) transmitted by the wireless terminal 1 does not overlap. If the duration of the UL OFDMA 82 becomes too long, there would be a period when the UL OFDMA 82 and the ACK frame 84 are both transmitted to the access point 11. In such a case, it becomes difficult to maintain the consistency of the frame transmission and reception sequence.

Thus, in the frame transmission and reception sequence of FIG. 11, a condition similar to that of the first embodiment needs to be satisfied to keep the sequence consistent. Specifically, the condition (8) below has to be satisfied.

$$T_D \geq T_{UO} - T_{SIFS} \quad (8)$$

Here, $T_D$ is the duration of the data frame 83. $T_{UO}$ is the duration of the UL OFDMA 82. $T_{SIFS}$ is the period defined in SIFS.

As in the first embodiment, if the duration of the data frame (second frame) is shorter than the UL OFDMA (third frame), the access point 11 (first wireless communication device) executes control process to ensure that the relation (8) above is satisfied. Specifically, the access point 11 extends the duration of the data frame (second frame). Examples of methods for generating data frames (second frames) with durations longer than the default value (initial setting) is addition of dummy data, changes in transmission rate and changes in encoding methods.

Figure 12:
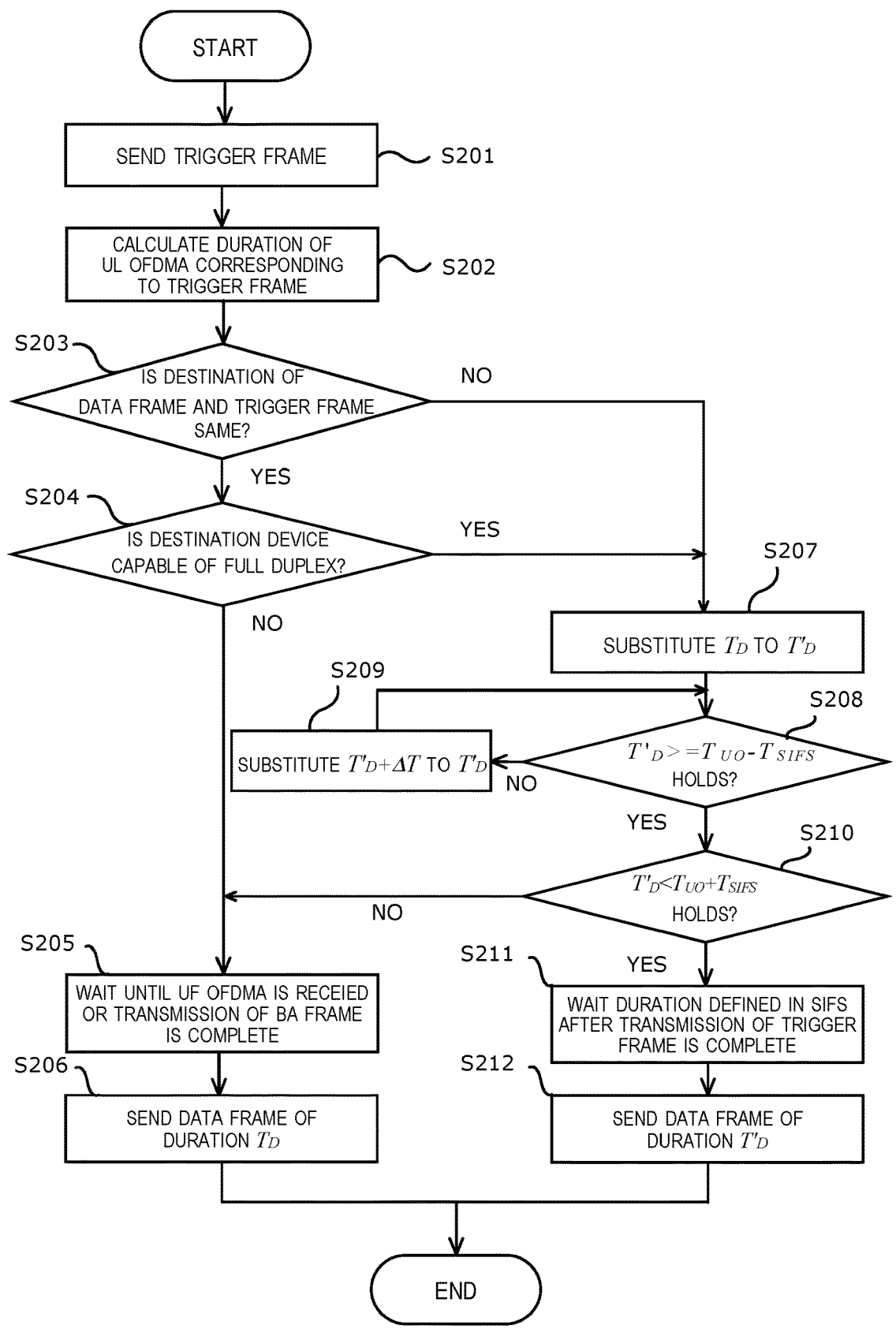
FIG. 12 is a flowchart of a process executed by the electronic apparatus when duration of UL OFDMA is shorter than duration of data frame.

Next, another process executed by the wireless communication device to maintain the consistency of the frame transmission and reception sequence is described. FIG. 12 is a flowchart of a process executed by the wireless communication device when duration of UL OFDMA is shorter than duration of data frame. Below, the process is explained in reference to the flowchart of FIG. 12. The process of FIG. 12 is executed by the first wireless communication device with full duplex communication capability. Examples of the first wireless communication device include the access point 1 in FIG. 1.

First, the first wireless communication device transmits a Trigger frame (first frame) to the first terminal (Step S201). Next, the first wireless communication device calculates the duration of the UL OFDMA (third frame) corresponding to the Trigger frame (first frame) (Step S202). It is possible to estimate the duration of the UL OFDMA (third frame) corresponding to the first frame by referring to the configuration of the transmission rate of the first frame, the number of bytes in the ACK frame, the configuration of the encoding scheme or the like.

Next, the first wireless communication device determines whether the destination device of the data frame which is transmitted next (second frame) is the same as the destination device of the first frame (Step S203). If the destination device of the data frame (second frame) is the same as the Trigger frame (first frame), the process proceeds to step S204. If the destination device of the data frame (second frame) is different from the Trigger frame (first frame), the process proceeds to step S207.

In step S204, the first wireless communication device confirms whether the destination device of the data frame (second frame) has full duplex communication capabilities. When the wireless communication device establishes connections (associates) with other wireless communication devices, it notifies the capabilities which are supported. Therefore, the first wireless communication device determines whether other wireless communication devices are capable of full duplex communication by saving information on the capabilities supported by other devices.

If the wireless communication device which is in the destination of the data frame (second frame) is capable of full duplex communication, the process proceeds to step S207. If the wireless communication device which is in the destination of the data frame (second frame) is not capable of full duplex communication, the process proceeds to step S205. In step S205, the wireless communication device waits until the UL OFDMA (third frame) is received or when the transmission of the BA frame is completed. Then, the wireless communication device transmits the data frame (second frame) without changing the duration (Step S206). Thus, in step S206, the data frame (second frame) is transmitted to another wireless communication device with default (initial) duration $T_D$. The default duration of the second frame $T_D$ is an example of the second duration.

In step S207, the default value for the duration of the data frame (second frame) $T_D$ is substituted to $T'_D$. Here, $T'_D$ indicates the duration of the generated data frame (second frame). Next, the wireless communication device determines whether $T'_D$ is equal to or greater than the difference between the duration of UL OFDMA $T_{UO}$ and the period of SIFS $T_{SIFS}$ (step S208).

If it is determined that the relation $T'_D < T_{UO} - T_{SIFS}$ holds in step S208, $T'_D + \Delta T$ is substituted to $T'_D$. Then, a second frame of duration $T'_D$ is generated (Step S209). $\Delta T$ is an example of the third duration. The length of ΔT (third duration) is not limited. It is possible to generate data frames (second frames) with durations longer than the default value by generating frames including dummy data. Also, it is possible to set the transmission rate to values lower than the default value. It is possible to use encoding schemes which are different from the default configuration. In one embodiment, the above methods are combined to control the duration of the frame. The method used to control the duration of the frame is not limited. If the duration $T'_D$ of the data frame (second frame) is extended, step S208 is executed again. In step S208, it is confirmed whether the relation $T'_D >= T_{UO} - T_{SIFS}$ is satisfied.

If it is determined that the relation $T'_D >= T_{UO} - T_{SIFS}$ holds in step S208, the process proceeds to step S210. In step S210, it is confirmed whether the relation $T'_D < T_{UO} + T_D + T_{SIFS}$ is satisfied. Thus, it is confirmed whether the duration of the data frame (second frame) is less than the sum of the duration of UL OFDMA (third frame), the default duration of the data frame (second frame) $T_D$ and the period of SIFS $T_{SIFS}$.

If it is determined that the relation $T'_D < T_{UO} - T_{SIFS}$ holds in step S210, the process proceeds to step S211. In step S211, the wireless communication device waits until the period defined in SIFS has elapsed, after the transmission of the Trigger frame (first frame) is completed. Then, a data frame (second frame) with duration $T'_D$ is transmitted (Step S212). If the process of step S209 is executed, a data frame (second frame) with duration longer than the default value is transmitted in step S212.

If it is determined that the relation $T'_D <= T_{UO} - T_{SIFS}$ holds in step S210, the process proceeds to step S205 and step S206. A data frame (second frame) with default duration $T_D$ is transmitted. As mentioned later, if the relation $T'_D < T_{UO} + T_{SIFS}$ is not fulfilled, transmitting a data frame (second frame) with duration longer than the second duration (default duration) does not shorten the time required to complete the frame transmission and reception sequence. In some cases, the time required to complete the frame transmission and reception sequence becomes longer.

In above, a case when the duration of the second is shorter than the minimum value ($T'_D < T_A - T_{SIFS}$) was explained. In such cases, the duration $T'_D$ is extended. Next, the maximum configurable duration of the second frame $T'_D$ which enables the shortening of the frame transmission and reception sequence is described.

Figure 13:
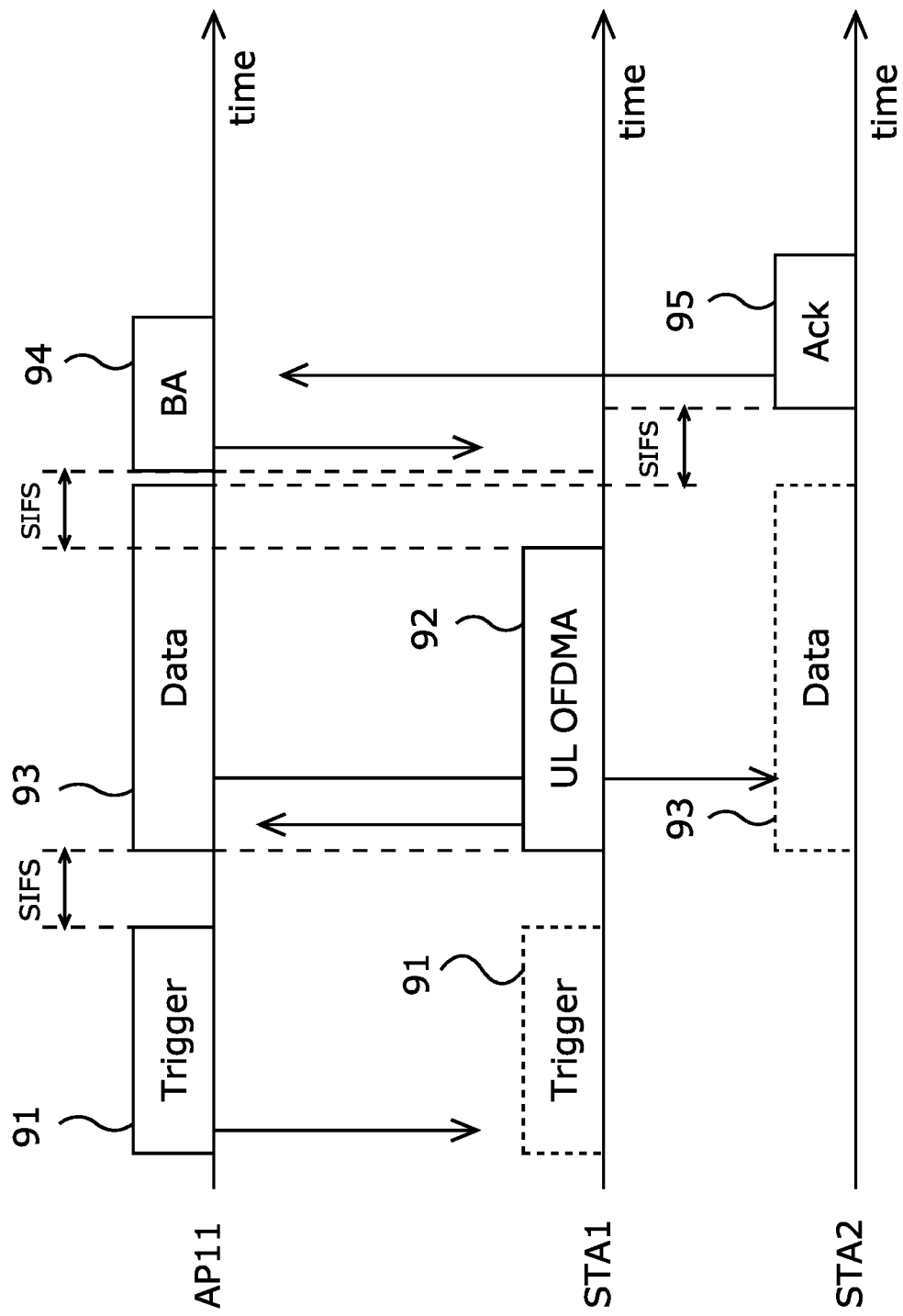
FIG. 13 is a diagram of a frame transmission and reception sequence when duration of data frame is longer than duration of UL OFDMA.

FIG. 13 is a diagram of a frame transmission and reception sequence when duration of data frame is longer than duration of UL OFDMA. In FIG. 13, frames transmitted by the access point 11, frames transmitted by the wireless terminal 1 and frames transmitted by the wireless terminal 2 are illustrated from the top to the bottom. The horizontal direction of FIG. 13 represents the time. Thus, the length of the frames in FIG. 13 illustrate the length of transmission time (duration) of frames. Below, the frame sequence is explained in reference to FIG. 13.

In the frame transmission and reception sequence of FIG. 13, the transmission of a UL OFDMA 92 (third frame) by the wireless terminal 1 and the transmission of a data frame 93 (second frame) by the access point 11 is started simultaneously. The destination device of the data frame 93 is the wireless terminal 2. The duration of the data frame 93 (second frame) is longer than the duration of the UL OFDMA 92 (third frame). However, if the duration of the UL OFDMA 93 becomes too long, even after the period defined in SIFS has elapsed since the access point 11 completed the reception of UL OFDMA 92 (third frame), the transmission of data frame 93 (second frame) would be continuing. In such cases, the access point 11 cannot start the transmission of a BA frame 94 (response frame).

The access point 11 has to transmit the BA frame 94 (response frame) to the wireless terminal 1 as confirmation of delivery in highest priority if the period defined in SIFS elapsed after the acceptance of UL OFDMA (third frame) is completed. To ensure that the response frame is transmitted in a specific timing, an upper limit is set to the duration of the data frame 93 (second frame) transmitted from the access point 11 to the wireless terminal 2.

Specifically, the duration of the data frame 93 (second frame) needs to satisfy the following condition (9).

$$T_D < T_{UO} + T_{SIFS} \tag{9}$$

Here, $T_D$ is the duration of the data frame 93 (second frame). $T_{UO}$ is the duration of UL OFDMA 92 (third frame). $T_{SIFS}$ is the period defined in SIFS.

The first wireless communication device (access point 11) according to the embodiment has to transmit a response frame after completing the reception of the second frame. Thus, there is a difference in the condition of the frame transmission and reception sequence compared to the first embodiment. Therefore, the conditions (5) and (9) both indicating the upper limit of the duration of the second frame are different.

If the duration of the data frame 93 (second frame) is too long, the duration of UL OFDMA 92 (third frame) has to controlled by the access point 11 (first wireless communication device) to ensure that the relation (9) is satisfied. For example, in one embodiment, transmission rates lower than the default value is specified for UL OFDMA 92 (third frame) by using control information included in the Trigger frame 91 (first frame). In another embodiment, the size of user data which could be transmitted by the UL OFDMA 92 (third frame) is extended by using control information included in the Trigger frame 91 (first frame). In some embodiments, the encoding scheme is changed from the default configuration to generate a UL OFDMA 92 (third frame) with durations which are longer than the default (initial) value (second duration).

Figure 14:
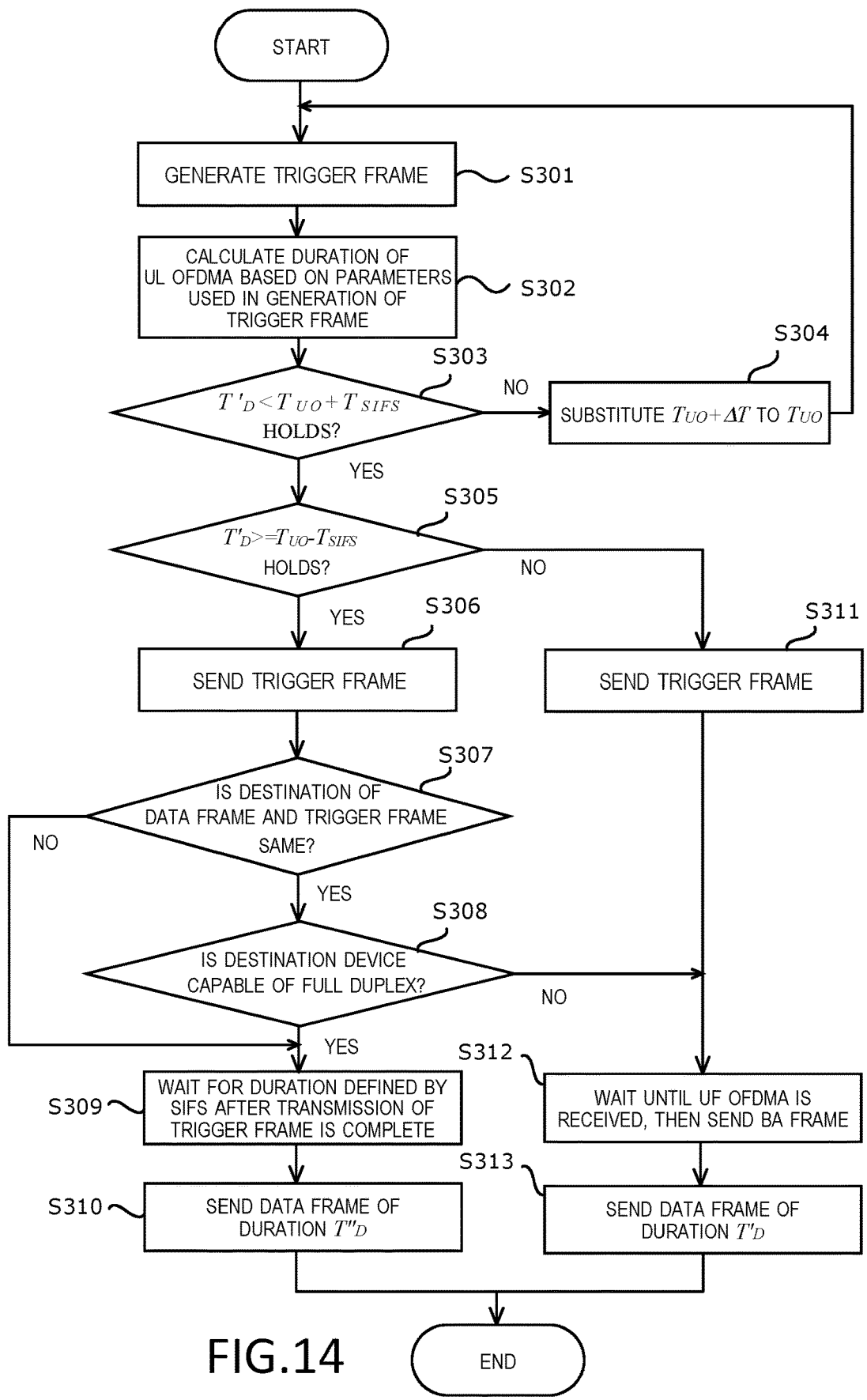
FIG. 14 is a flowchart of a process executed by the electronic apparatus when duration of data frame is shorter than duration of UL OFDMA.

Next, the process executed by the wireless communication device to maintain the consistency of the frame transmission and reception sequence is explained. FIG. 14 is a flowchart of a process executed by the wireless communication device when duration of the data frame is shorter than duration of UL OFDMA. The process of FIG. 14 is executed by the first wireless communication device has full duplex communication capability. Examples of the first wireless communication device include the access point 1 in FIG. 1.

First, the first wireless communication device generates a Trigger frame (first frame) (step S301). Next, the first wireless communication device calculates the duration of UL OFDMA (third frame) based on the parameters configured in the Trigger frame (first frame) (step S302). Then, the first wireless communication device confirms whether the duration of the generated data frame (second frame) $T'_D$ is less than the sum of the default duration of the UL OFDMA (third frame) $T_{UO}$ and the period defined in SIFS $T_{SIFS}$ (step S303). The default duration of the UL OFDMA (third frame) $T_{UO}$ is an example of a fourth duration.

If it is determined that the relation $T'_D < T_{UO} + T_{SIFS}$ holds in step S303, the wireless communication device confirms whether the duration of the generated data frame (second frame) $T'_D$ is equal to or greater than the difference between the duration of the UL OFDMA (third frame) $T_{UO}$ and the period defined in SIFS $T_{SIFS}$ (Step S305).

If it is determined that the relation $T'_D \geq T_{UO}+T_{SIFS}$ holds in step S303, the wireless communication device substitutes $T_{UO}+\Delta T$ to the duration of UL OFDMA (third frame) $T_{UO}$. The duration of the UL OFDMA (third frame) specified by the control information in the Trigger frame (first frame) is a value longer than the default duration (fourth duration) (Step S304). $\Delta T$ is an example of the third duration. The length of $\Delta T$ (third duration) is not limited.

In one embodiment, the duration of the UL OFDMA (third frame) $T_{UO}$ is configured to a value longer than the default value by adding dummy data. In another embodiment, the transmission rate of the UL OFDMA (third frame) $T_{UO}$ is configured to a value lower than the default value. In a different embodiment, the encoding method is set to a configuration different from default. In one embodiment, the above methods are combined to control the duration of the UL OFDMA (third frame) $T_{UO}$. The methods for controlling the duration of frames are not limited.

If the duration of the UL OFDMA (third frame) $T_{UO}$ is extended, the process returns to step S301. In step S301, a Trigger frame (first frame) which specifies a UL OFDMA (third frame) with duration longer than the previous value is generated.

If it is determined that the relation $T'_D \geq T_{UO}-T_{SIFS}$ holds in step S305, the first wireless communication device transmits the Trigger frame (first frame) to the first terminal (step S306). If the specified duration of UL OFDMA (third frame) $T_{UO}$ is longer than the default value (due to step S304), a Trigger frame (first frame) specifying duration of UL OFDMA (third frame) $T_{UO}$ longer than the default value is transmitted in step S306. Thereby, the duration of the UL OFDMA (third frame) transmitted from the first terminal to the first wireless communication device is controlled.

Next, the wireless communication device determines whether the destination device of the data frame (second frame) transmitted next is the same device as the destination device of the Trigger frame (first frame) (step S307). If the destination device of the data frame (second frame) is the same device as the destination device of the Trigger frame (first frame) the process proceeds to step S308. If the destination device of the data frame (second frame) and the destination device of the Trigger frame (first frame) are different, the process proceeds to step S309.

If it is determined that the relation $T'_D < T_{UO}-T_{SIFS}$ holds in step S305, the first wireless communication device determines to use half duplex communication instead of full duplex communication. First, the first wireless communication device transmits a Trigger frame (first frame) to the first terminal (step S311). Then, the first wireless communication device waits until the reception of the UL OFDMA (third frame) including the acknowledgement information of the Trigger frame (first frame) is completed. If the first wireless communication device receives the UL OFDMA (third frame), a BA frame (response frame) is transmitted after period defined in SIFS has elapsed (step S312). Finally, the first wireless communication device transmits a data frame (second frame) of duration $T'_D$ to the destination wireless communication device (step S313).

In step S308, the first wireless communication device determines whether the destination device of the data frame (second frame) is capable of full duplex communication. When the wireless communication device establishes a connection (associates) with another wireless communication device, the information on the supported capabilities are notified. Therefore, by saving the information on the supported capabilities, the first wireless communication device determines whether other wireless communication devices support full duplex communication.

If the wireless communication device which is in the destination of the data frame (second frame) is capable of full duplex communication, the process proceeds to step S309. If the wireless communication device which is in the destination of the data frame (second frame) is not capable of full duplex communication, the process proceeds to step S312 and later steps. In this case, the data frame (second frame) is transmitted to the destination wireless communication device according to the frame transmission and reception sequence of half duplex communication.

In step S309, the first wireless communication device waits for the period defined in SIFS after the transmission of the Trigger frame (first frame) is completed. Then, the first wireless communication device transmits a data frame (second frame) of duration $T'_D$ to the destination wireless communication device (step S310).

In the flowchart of FIG. 14, the condition (9) was used for duration of frames. However, if the duration of the data frame (second frame) is close to the sum of the duration of the UL OFDMA (third frame) and the period defined in SIFS, there is a risk that the access point 11 (first wireless communication device) recognizes erroneously that the tail of the data frame (second frame) is the head of the BA frame (response frame). To prevent such risks, in one embodiment, the maximum duration of the data frame (second frame) is set to a value shorter than the maximum defined by relation (9).

In one embodiment, the access point 11 (first wireless communication device) executes control processes to ensure that the transmission of the data frame (second frame) is completed before the timing when the wireless communication device completes the transmission of UL OFDMA (third frame) and enters waiting state. For example, the maximum duration of the data frame (second frame) is set to a value equal to the duration of the UL OFDMA (third frame). Also, if the duration of the data frame (second frame) is configured to a value longer than the duration of the UL OFDMA (third frame), it is possible to allow only a small difference. In one embodiment, the maximum duration of the data frame (second frame) is 2 microseconds longer than the duration of the UL OFDMA (third frame).

Third Embodiment

If some of the wireless communication devices execute full duplex communication in wireless communication systems, it is desired to keep the interference between the radio signals to minimum, for the sake of communication quality. For example, in the frame transmission and reception sequence of FIG. 6, there is a risk of the radio signal corresponding to the response frame transmitted by the wireless terminal 1 interfering with the radio signal corresponding to the data frame transmitted from the wireless terminal 2 to the access point 11. Such interference affects communication quality. Therefore, in the third embodiment, a method for reducing inference by controlling the transmission rate of the frames is described.

However, if the transmission rate of the frames are configured to a lower value, the duration of the frames become longer. Thus, there is a possibility that the frame transmission and reception sequence are affected. For example, if the duration of the data frame 43 (second frame) satisfies the condition of (6), it is possible to set the transmission rate to a lower value without affecting the consistency of the frame transmission and reception sequence and the overall communication speed. Below, a process of controlling the transmission rate of the data frame 43 (second frame) is explained using specific values.

Suppose the length of the data frame 43 (second frame) L_d is 50 bytes and the transmission rate R_d is 54 Mbps. In this case, the duration of the data frame 43 (second frame) T_d is 28 microseconds.

If the transmission rate R_d is lowered to 9 Mbps, the duration of the data frame 43 (second frame) is 68 microseconds. If the transmission rate R_d is lowered to 6 Mbps, the duration of the data frame 43 (second frame) is 92 microseconds. Referring to the results, the case when R_d=9 Mbps satisfies the condition of (6). Therefore, it is possible to decrease the transmission rate from 54 Mbps to 9 Mbps to reduce interference.

By using the wireless communication devices and the wireless communication methods described in the aforementioned embodiments, the consistency of the frame transmission and reception sequence is maintained while the effective communication speed is improved in cases when wireless communication devices capable of full duplex communication and wireless communication devices only capable of half duplex communication are combined.

Fourth Embodiment

In this embodiment, the MAC frame format defined in IEEE802.11 is explained. The frames described in this embodiment are examples of frames described in the aforementioned embodiments. FIG. 15 is a MAC frame format defined in IEEE 802.11.

In IEEE802.11 series, wireless LAN standards such as IEEE802.11a, IEEE802.11b, IEEE802.11g, IEEE802.11n, IEEE802.11ac, IEEE802.11ax or successor standards are defined.

The MAC frame includes a MAC Header part, a Frame Body part and a Frame Check Sequence (FCS) part. In the MAC Header part, information necessary for the reception process of the MAC layer is configured. In the Frame Body part, various data payloads are stored depending on the type of frames. In the FCS part, the CRC (Cyclic Redundancy Code) used for confirmation of acceptance of the MAC Header part and Frame Body part is stored.

The MAC Header part includes a Frame Control field, a Duration/ID field, a plurality of Address fields and a Sequence Control field. If the MAC frame is a QoS Data frame, the MAC Header part includes a QoS Control field.

The Frame Control field includes a Type field, a Sub type field, a To DS field, a From DS field, a more fragment field, a protected frame field and an order field.

In the Type field, information which identifies the frame type of the MAC frame is stored. Frame types include control frames, management frames and data frames. In the Subtype field, information which identifies the type of MAC frame within each frame type is stored. In the To DS field, information which identifies whether the destination device is a wireless base station or a wireless terminal is stored. In the From DS field, information which identifies whether the source device is a wireless base station or a wireless terminal is stored.

The more fragment field is used in cases when the data payload in the Frame Body part is fragmented. The more fragment field indicates whether there are frames which store subsequent fragments of data. The protected frame field stores information which indicates whether the MAC frame is in protected state or not. In the order field, information which indicates whether the order of the MAC frames should not be altered or not, when the MAC frames are relayed is stored.

In a Duration/ID field, the period to wait until execution of transmission process (NAV: Network Allocation Vector) or the identification number allocated to the wireless terminals connecting to the access point is stored. The length of the Duration/ID field is 16 bits. If the most significant bit (MSB) is zero, the Duration (NAV) is stored in the remaining 15 bits. If the most significant bit is one, the ID (identification number) is stored in the remaining 15 bits.

In the Address1 field, the MAC address of the wireless communication device which directly receives the MAC frame is configured. Each wireless communication device refers to the Address1 field to confirm whether the destination of the MAC frames are configured as the corresponding wireless communication device.

In the Address1 field, the MAC address of the wireless communication device which received the MAC frame previously is stored. In the Address3 field, the MAC address of the final destination wireless communication device is stored in the case of uplink communication. In the case of downlink communication, the MAC address of the source wireless communication device is stored.

In the Sequence Control field, the sequence number of the transmitted data or the fragment number of fragmented data is stored. The Address4 field exists only when a MAC address is transmitted from a wireless base station to another wireless base station. In the Address4 field, the MAC address of the source wireless communication device is stored.

If the MAC frame is a QoS data frame (type of data frame), the corresponding MAC frame includes a QoS Control field. First, the wireless communication device refers to the Type field of the MAC frame to confirm whether the MAC frame is a data frame. If the MAC frame is a data frame, the value configured in the Subtype field is confirmed to determine whether the MAC frame is a QoS Data frame or a non-QoS Data frame.

The QoS Control field includes a TID field and an ACK policy field. In the TID field, values between 0 to 15 is configured depending on the type of data traffic. Each wireless communication device determines the type of data traffic by referring to the TID field. In the ACK policy field, the method used in confirmation of delivery is stored. Each wireless communication device determines whether the QoS Data frame is transmitted with Normal ACK policy setting, Block ACK policy setting or No ACK policy setting.

For example, if a QoS Data frame is transmitted with Normal ACK policy setting, the wireless communication device which received the corresponding QoS Data frame has to respond by transmitting a response frame in highest priority.

The configuration of the MAC frame and the MAC header of FIG. 15 is only an example. For example, the QoS Control field mentioned above was added in the IEEE802.11e standard. Thus, in new standards, new fields may be added to the MAC header. Also, the usage of the fields may change.

Fifth Embodiment

In the present embodiment, [1] frame types in the wireless communication system, [2] disconnecting between wireless communication devices, [3] access to the wireless LAN system and [4] a frame interval of a wireless LAN are described.

[1] Frame Types in the Wireless Communication System

As mentioned above, the frames used by a wireless access protocol of the wireless communication system are divided roughly into three categories; the data frame, the management frame and the control frame. These categories are generally indicated in the header part of frames. The frame type can be indicated using one field or by using a combination of two fields. In the IEEE 802.11 standard, the frame type is identified by using two fields; the Type field and the Subtype field of the Frame Control field in the header part of the MAC frame. The Type field is generally used for classifying frames into data frames, management frames, or control frames. The Subtype field is used for identifying more detailed types including frame types such as a beacon frame which is a type of the management frame.

The management frames are frames used to manage physical communication links with different wireless communication devices. For example, there are frames used to configure communication settings with other wireless communication devices. Also, there are frames used for releasing communication links (disconnecting links). There are frames used for executing power saving operations of the wireless communication device.

The data frames are frames used for transmitting data generated by the wireless communication device to other wireless communication devices. To transmit a data frame, the physical communication link with another wireless communication device needs to be established. The transmitted data is generated in a higher layer of the present embodiment. For example, data is generated by a user's operation.

The control frames are frames used to execute control processes during transmission and reception (exchange) of the data frame with different wireless communication devices. A response frame transmitted for the acknowledgment when the wireless communication device receives the data frame or the management frame is a type of a control frame. Examples of the response frame include ACK frames or BlockACK frames. RTS frames and CTS frames also fall into the category of control frames.

The three types of frames are processed in the physical layer and transmitted as physical packets from an antenna. In the IEEE 802.11 standard (including standards such as IEEE Std 802.11ac-2013), an association process is defined as one of the procedures for establishing connections. The association request frame and the association response frame used in this procedure are management frames. The association request frames and the association response frames are management frames transmitted in a unicast scheme. The wireless communication terminals receiving these frames transmit ACK frames as response frames.

[2] Disconnecting Between Wireless Communication Devices

Explicit methods and implicit methods exist for disconnection between the wireless communication devices. In the explicit method, a frame used for disconnecting with any one of the connected wireless communication devices is transmitted. One example of such frames is the Deauthentication frame defined in IEEE 802.11 standard. The Deauthentication frame falls into the category of the management frames. Normally, it is determined that the connection is released when the frame is transmitted for disconnecting with a wireless communication device, in the transmitting side. In the receiving side, it is determined that the connection is released when the frame for disconnecting is received. When the connection is released, the wireless communication device returns to the initial state of communication. In the initial state, the wireless communication device searches for another wireless communication device which is a potential communicating partner, for example.

When the wireless communication base station disconnects with a wireless communication terminal, the base station deletes information of the wireless communication device from a connection management table. If the wireless communication base station assigns AIDs to each wireless communication terminal which joins the BSS in the association process, assignment information to the AID is deleted. Then, the released AID can be assigned to wireless communication device which join the BSS.

In the implicit method, disconnection is determined when transmission of a frame (transmission of a data frame, management frame or transmission of a response frame corresponding to the frame transmitted by the subject device) is not detected from the partner wireless communication device. Disconnection is such cases are allowed because there are cases when it is not possible to receive radio signals or decode signals due to large distances with the partner wireless communication device and maintain links. In such cases, the reception of frames for disconnecting cannot be expected.

One way to implement the implicit method is, by using a timer. When a data frame that requests an acknowledgment response frame is transmitted, a first timer (for example, a retransmission timer for a data frame) that limits the retransmission period of the frame is activated. If the acknowledgement response frame corresponding to the data frame is not received, the data frame is retransmitted until the first timer expires (until the retransmitted period elapses). When the acknowledgment response frame to the frame is received, the first timer is stopped.

When the acknowledgment response frame is not received before the expiration of the first timer, a management frame which confirms whether the wireless communication device of the connection partner is still present (within the communication range) is transmitted. In the same time, a second timer (for example, a retransmission timer for the management frame) which limits the retransmission period of the frame is activated. The second timer is used similarly to the first timer. If an acknowledgment response frame to the frame is not received, the management frame is retransmitted until the expiration of the second timer. When the second timer expires, it is determined that the connection is lost.

Another method is use of a third timer. The third timer is activated when a frame is received from a wireless communication device of the connection partner. The third timer is stopped every time the frame is newly received from the wireless communication device of the connection partner. The third timer is activated from the initial value again. When the third timer expires, a management frame which confirms whether the wireless communication device of the connection partner is still present (within the communication range) is transmitted. In the same time, a second timer (for example, a retransmission timer for the management frame) which limits the retransmission period of the frame is activated. If an acknowledgment response frame to the frame is not received, the frame is retransmitted until the expiration of the second timer. When the second timer expires, it is determined that the connection is lost.

The management frame used to confirm whether the wireless communication device of the connection partner is still present in the later case may be different from the management frame used in the former case. The timer to limit the period when retransmission of the management frame is permitted can be the second timer used in the first case or a different timer.

[3] Access to the Wireless LAN System

In wireless LAN systems, communication with a plurality of wireless communication devices is possible. However, in some cases access to the wireless LAN system turn out to be competing. In IEEE802.11 (including successor standards or the like) wireless LAN, CSMA/CA provides the basis of access. For example, suppose that transmission of data by a certain wireless communication device is detected by a wireless communication device and the device starts to transmit a different data after a certain period elapsed after the transmission of data is completed. In such cases, plurality of wireless communication devices which detected the transmission would transmit different data, simultaneously. Then a plurality of radio signals would collide, making transmission of frames a failure.

By having each wireless communication device detect transmission of data by other wireless communication devices and waiting for a random time after the transmission of data is completed, the timing when the transmission of next data is dispersed stochastically. Thus, the wireless communication device which has obtained the smallest random time can transmit frames successfully without the risk of collision. Since the authority to transmit data is allocated to a plurality of wireless communication devices randomly, methods which use Carrier Avoidance are suitable for sharing the wireless communication medium fairly across a plurality of wireless communication devices.

[4] Frame Interval of Wireless LAN

The frame interval of IEEE802.11 wireless LAN is described. There are several types of frame intervals used in IEEE802.11 wireless LAN including distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN. The precise time which elapsed since the previous frame is not used as the definition. Therefore, the definition used here follows that of the IEEE802.11 wireless LAN system. In IEEE802.11 wireless LAN, a waiting time at the time of random access based on CSMA/CA is assumed to be the sum of a fixed time and a random time. Such a definition is used to distinguish the fixed time.

DIFS and AIFS are frame intervals used when initiating exchange of frames using CSMA/CA in a contention period when there is competition with other wireless communication devices. DIFS is used in cases when priority according to the traffic type is not distinguished. AIFS is used in cases when priority by traffic identifier (TID) is provided.

Since the executed process is similar for DIFS and AIFS, the explanation below will refer mainly to AIFS. In IEEE802.11 wireless LAN, access control including the starting of frame exchanges in the MAC layer is performed. If QoS (Quality of Service) is supported for data transferred from a higher layer, the traffic type is notified together along the data. The data is classified according to priority based of the traffic type at the time of access. The classification at the time of this access is referred to as "access category (AC)". Therefore, the value of AIFS is provided for each access category.

PIFS is a period is shorter than the values of DIFS and AIFS, which is a frame interval that enables access which is more preferential than other competing wireless communication devices. SIFS is a frame interval which is used for transmitting responding control frames or in cases when burst transmission is executed in frame exchange after the authority for access is acquired. EIFS is a frame interval used when reception of a frame fails (when it is determined that the received frame is in error state).

RIFS is a frame interval which is used in cases when a plurality of frames is transmitted consecutively to the same wireless communication device (burst transmission) after the authority for access is acquired. Transmission of response frames from the receiving wireless communication is not required when RIFS is used.

Suppose that it is determined that the medium is busy (used) as a result of carrier sensing, when a transmission request of a data frame (W_DATA1) is generated by a wireless communication device. In this case, from the time when the carrier sensing detects idle, the wireless communication device waits for AIFS which is a fixed time. Then, the wireless communication device waits for a random time (random backoff) before transmitting the data frame W_DATA1 to the destination device.

The random time is calculated by multiplying a slot time with a pseudorandom integer which is obtained from an uniform distribution between contention windows (CW) including numbers between 0 and some integer. Here, the product of CW and the slot time is called the "CW time width". The initial value of CW is defined as CWmin. The value of CW is increased every time data is retransmitted until CW reaches CWmax. Both CWmin and CWmax have values for each access category.

The wireless communication device which is the destination device of W_DATA1, transmits a response frame (W_ACK1) after period defined in SIFS elapses after the communication medium becomes vacant, if the reception of the data frame is successful and the corresponding data frame is a frame which requires the transmission of a response frame. The wireless communication device which transmitted W_DATA1 can transmit the next frame (for example, W_DATA2) after period defined in SIFS elapses after the communication medium becomes vacant, if W_ACK1 is received and it is within the transmission burst time limit.

AIFS, DIFS, PIFS and EIFS are functions of SIFS and the slot-time. The values of SIFS and the slot time are defined for each physical layer. Parameters with values assigned for each access category include AIFS, CWmin and CWmax. These values can be configured for each communication group (which is a basic service set (BSS) in IEEE802.11 wireless LAN). Nonetheless, default values are defined.

For example, suppose that SIFS is 16 µs and the slot time is 9 µs in the 802.11ac standard. In such case, PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS is the sum of SIFS, DIFS, and the time length of a response frame transmitted at the lowest physical rate. In wireless communication devices which can utilize EIFS efficiently, it is possible to estimate the duration of a physical packet which includes the response frame corresponding to the frame which launched EIFS. In such cases, EIFS is the sum of the estimated duration, SIFS and DIFS.

Note that the frames described in the above embodiments may indicate packets in the IEEE 802.11 standard or successor standards, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
transmitter circuitry configured to:
   transmit a first frame to a first terminal; and
   transmit a second frame to a second terminal when a first period elapsed after transmission of the first frame; and
receiver circuitry configured to receive a third frame including acknowledgement information of the first frame from the first terminal when the first period elapsed after transmission of the first frame,
wherein a time length of the second frame is set as equal to or greater than a difference between a time length of the third frame and a length of the first period, and
the electronic apparatus comprises processing circuitry configured to generate the second frame with a time length equal to a sum of a second time length and a third time length, when the second time length which is a default time length of the second frame is less than a difference between the time length of the third frame and the first period.

2. The electronic apparatus according to claim 1, wherein the time length of the second frame is less than a sum of the second time length, the time length of the third frame and the first period.

3. The electronic apparatus according to claim 1, wherein the time length of the second frame is less than a sum of the third time length and the first period.

4. The electronic apparatus according to claim 1, wherein the processing circuitry is configured to regenerate the second frame with the second time length when the time length of the generated second frame is equal to or greater than a sum of the second time length, the time length of the third frame and the first period,
the transmitter circuitry is configured to transmit the second frame which is regenerated.

5. The electronic apparatus according to claim 1, wherein the processing circuitry is configured to regenerate the second frame with the second time length when the time length of the generated second frame is equal to or greater than a sum of the third time length and the first period,
the transmitter circuitry is configured to transmit the second frame which is regenerated.

6. The electronic apparatus according to claim 1, wherein the processing circuitry is configured to adjust the time length of the second frame equal to the sum of the second time length and the third time length by setting a transmission rate to a value lower than a default transmission rate.

7. The electronic apparatus according to claim 1, wherein the processing circuitry is configured to generate the second frame including dummy data with a time length equal to the sum of the second time length and the third time length.

8. The electronic apparatus according to claim 1, wherein the processing circuitry is configured to use an encoding scheme which is different from a default encoding scheme to make the time length of the second frame equal to the sum of the second time length and the third time length.

9. The electronic apparatus according to claim 1, wherein the processing circuitry is configured to specify the time length of the third frame by using control information included in the first frame.

10. The electronic apparatus according to claim 9, wherein
the processing circuitry is configured to set the time length of the third frame to a sum of the third time length and a fourth time length, if a sum of the first period and the fourth time length is equal to or less than the second time length;
wherein the fourth time length is a default time length of the third frame.

11. The electronic apparatus according to claim 9, wherein
the control information includes at least transmission rate of the third frame, size of data included in the third frame or encoding scheme of the third frame.

12. The electronic apparatus according to claim 1, wherein
wireless communication is executed according to IEEE802.11 series standard.

13. A wireless communication method comprising the steps of:
   transmitting a first frame;
   waiting for a first period after transmission of the first frame is completed;
   receiving a third frame including acknowledgement information of the first frame;
   transmitting a second frame with a time length which is equal to or greater than a difference between a time length of the third frame and the first period; and
   generating the second frame with a time length equal to a sum of the second time length and a third time length if the second time length which is a default time length of a frame is less than the difference between the time length of the third frame and the first period.

14. The wireless communication method according to claim 13, wherein transmission of the third frame and transmission of the second frame are started simultaneously.

15. The wireless communication method according to claim 13, further comprising the step of:
   regenerating the second frame with the second time length if a time length of the second frame which is generated is equal to or greater than a sum of the second time length, the time length of the third frame and the first period.

16. The wireless communication method according to claim 13, further comprising the step of:
   regenerating the second frame with the second time length if a time length of the second frame which is generated is equal to or greater than a sum of the second time length and the first period.

17. The wireless communication method according to claim 13, further comprising the step of:
   specifying a time length of the second frame to a sum of a fourth time length and the third time length by using control information if a sum of the fourth time length and the first period is equal to or less than the second time length;
   wherein the fourth time length is a default time length of the third frame.

18. The wireless communication method according to claim 13, wherein
   wireless communication is executed according to IEEE802.11 series standard.

* * * * *